(12) United States Patent
Dimitri et al.

(10) Patent No.: US 6,880,041 B2
(45) Date of Patent: Apr. 12, 2005

(54) METHOD AND APPARATUS TO TRANSFER INFORMATION BETWEEN DIFFERENT CATEGORIES OF SERVERS AND ONE OR MORE DATA STORAGE MEDIA

(75) Inventors: Kamal Emile Dimitri, Tucson, AZ (US); Daniel James Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 174 days.

(21) Appl. No.: 10/079,643

(22) Filed: Feb. 20, 2002

(65) Prior Publication Data

US 2003/0158997 A1 Aug. 21, 2003

(51) Int. Cl.[7] .............................................. G06F 12/00
(52) U.S. Cl. ..................................................... 711/112
(58) Field of Search ............................ 711/4, 161, 162, 711/114, 112, 111

(56) References Cited

U.S. PATENT DOCUMENTS

| | | | | |
|---|---|---|---|---|
| 5,287,459 A | * | 2/1994 | Gniewek | 711/111 |
| 5,416,914 A | * | 5/1995 | Korngiebel et al. | 711/114 |
| 5,469,560 A | * | 11/1995 | Beglin | 711/112 |
| 5,487,579 A | | 1/1996 | Woodruff | 294/115 |
| 5,546,366 A | | 8/1996 | Dang | 369/30.39 |
| 5,925,119 A | | 7/1999 | Maroney | 710/315 |
| 5,948,075 A | * | 9/1999 | Osten | 710/8 |
| 6,198,593 B1 | | 3/2001 | Hori et al. | 360/92 |
| 6,202,124 B1 | * | 3/2001 | Kern et al. | 711/112 |
| 2002/0087880 A1 | * | 7/2002 | Rhoades | 713/201 |
| 2003/0051104 A1 | * | 3/2003 | Riedel | 711/154 |

OTHER PUBLICATIONS

IBM Technical Disclosure Bulletin, vol. 26, No. 11, Apr. 1984.

* cited by examiner

Primary Examiner—Matthew Kim
Assistant Examiner—Shane Thomas
(74) Attorney, Agent, or Firm—Dale F. Regelman

(57) ABSTRACT

A data storage and retrieval system which includes one or more hard disks individually housed in a portable hard disk drive unit, a first information transfer station capable of communicating with one or more first servers, and a second information transfer station capable of communicating with one or more second servers. A method to transfer information between those first servers, second servers, and hard disks. A data storage and retrieval system comprising computer useable medium having computer readable program code disposed therein, where that computer readable program code comprises a series of computer readable program steps to implement Applicants' method.

31 Claims, 15 Drawing Sheets

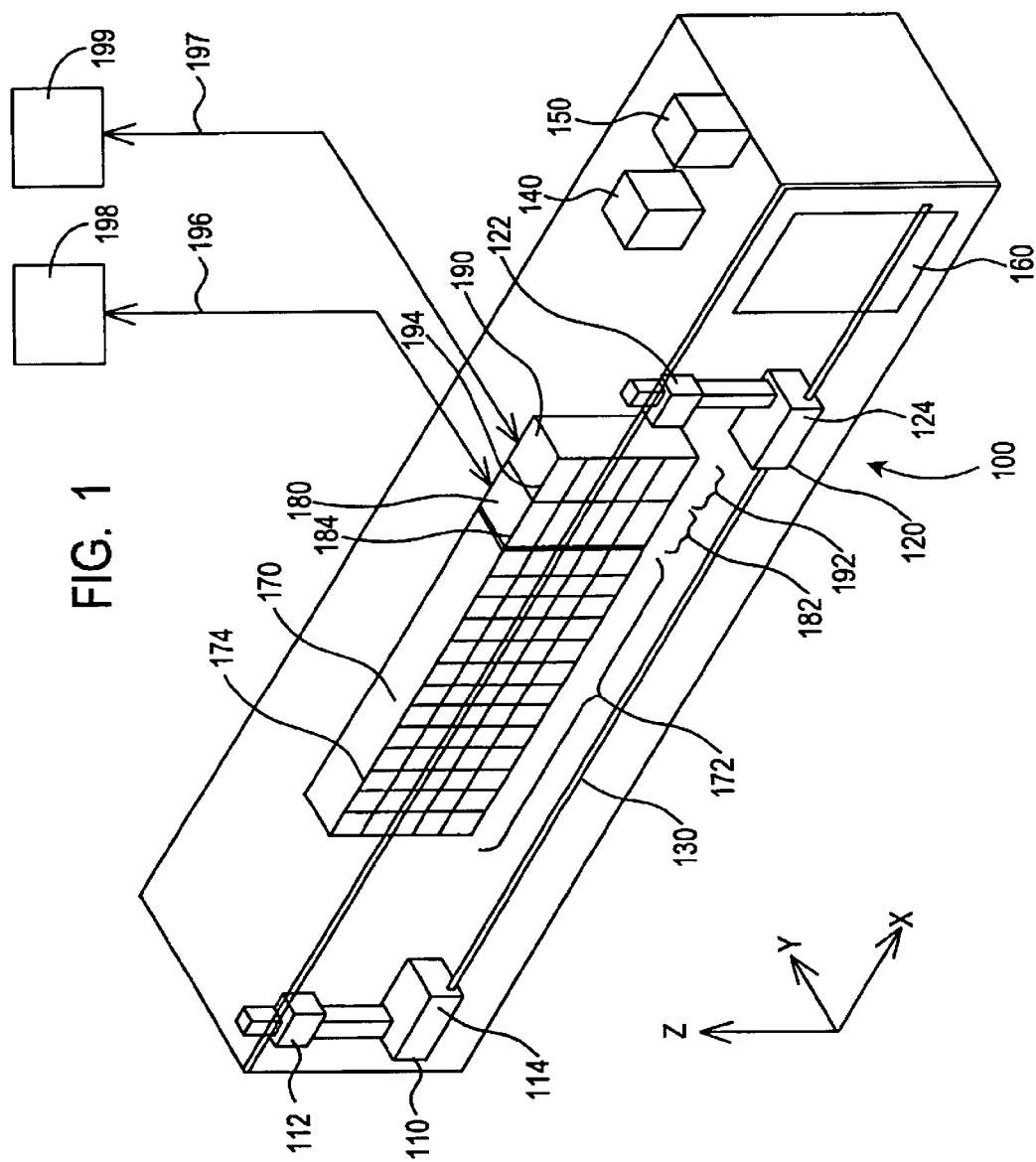

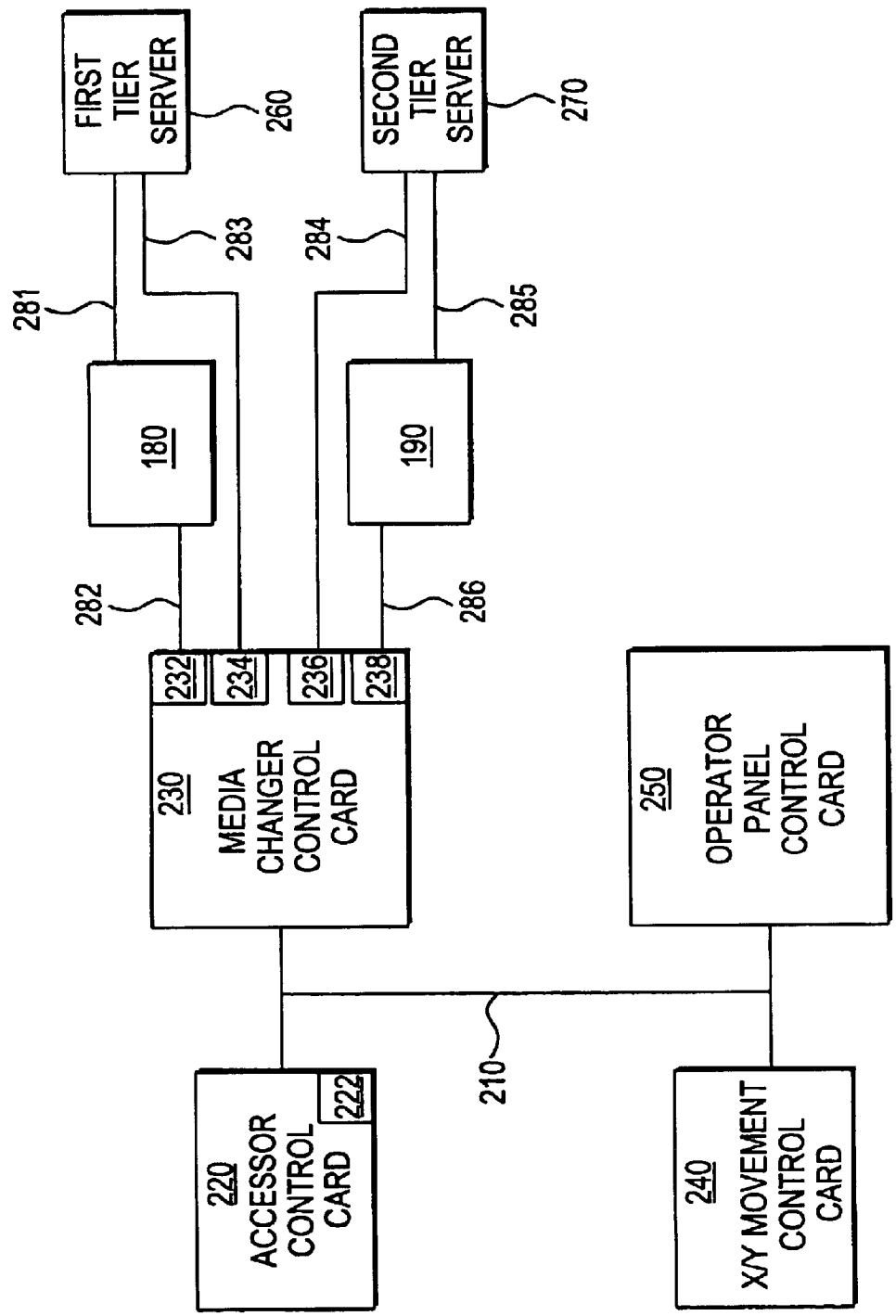

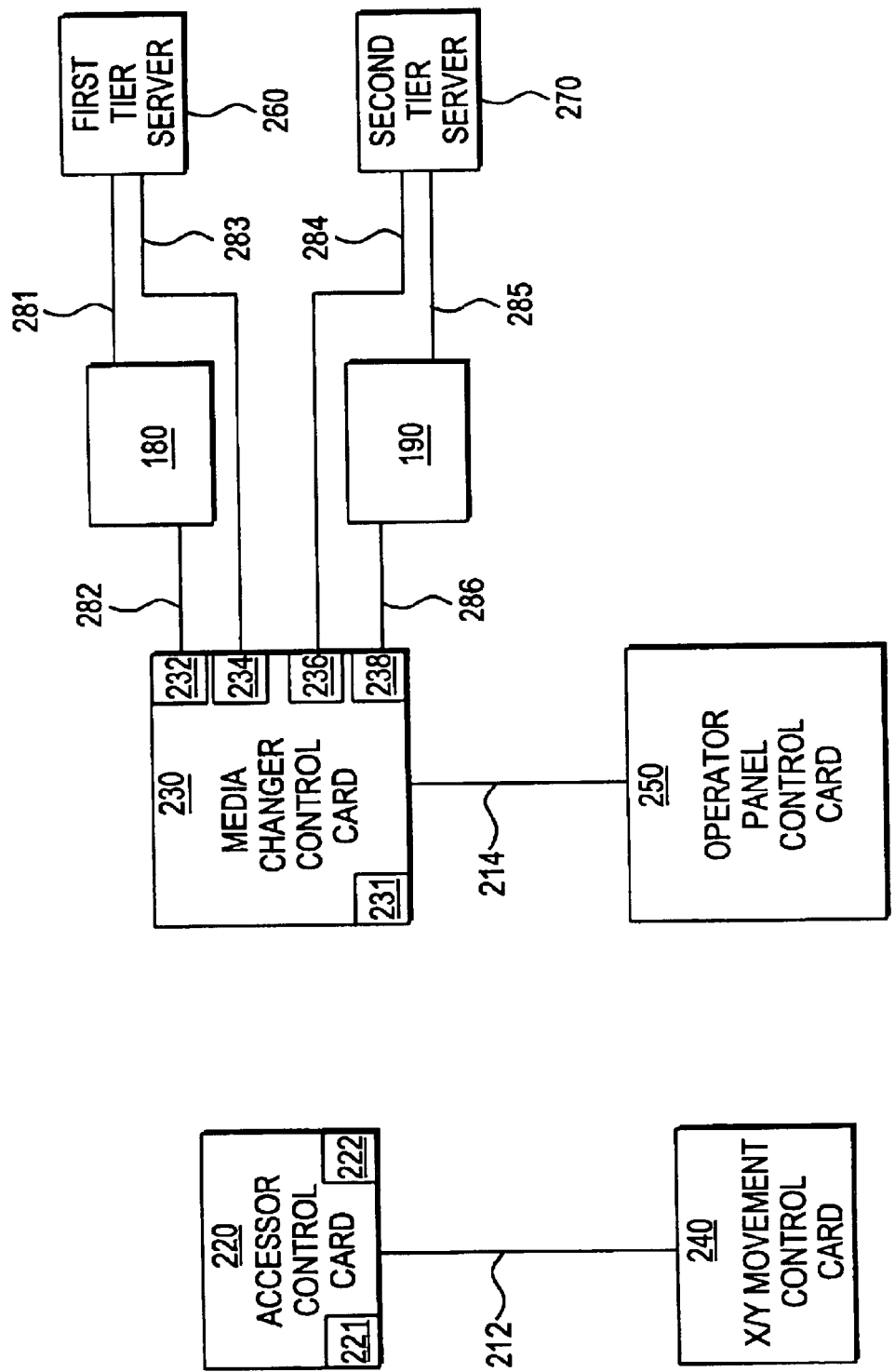

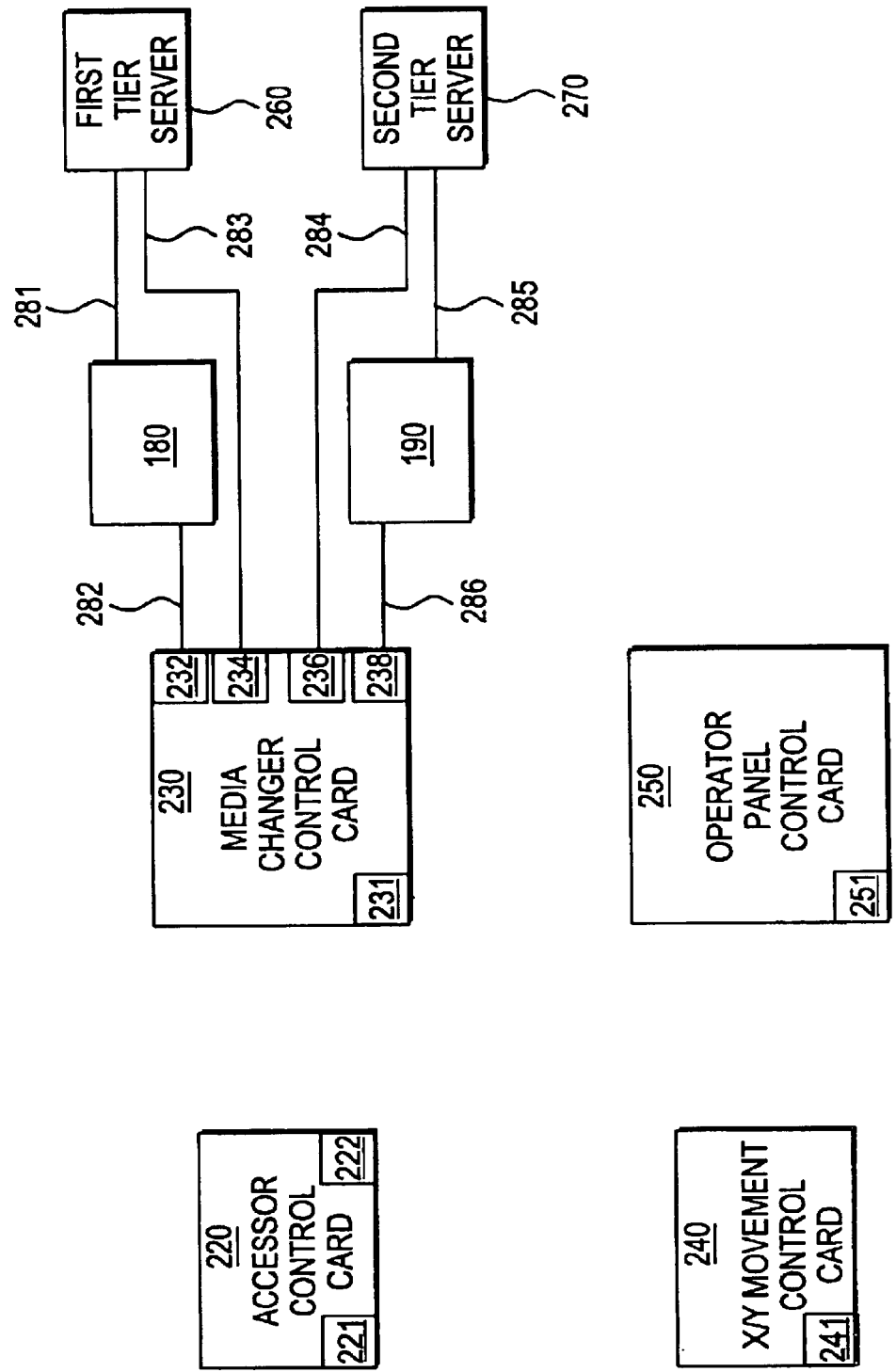

METHOD AND APPARATUS TO TRANSFER INFORMATION BETWEEN DIFFERENT CATEGORIES OF SERVERS AND ONE OR MORE DATA STORAGE MEDIA

FIELD OF THE INVENTION

Applicant's invention relates to an apparatus and method to transfer information between different categories of servers, and between those different categories of servers and one or more data storage media disposed in Applicants' data storage and retrieval system.

BACKGROUND OF THE INVENTION

Automated media storage libraries are known for providing cost effective access to large quantities of stored media. Generally, media storage libraries include a large number of storage slots on which are stored data storage media. Such data storage media may include one or more hard disks disposed in one or more hard disk drive units. One (or more) accessor typically accesses the hard disk drive units, and transports those units to a facility wherein information can be read from, or written to, the hard disks disposed in those hard disk drive units. Suitable electronics operate the accessor(s) and operate the data storage and retrieve system in order to transmit data to, and/or to receive data from, one or more on-line host computer systems.

In order to maximize the cost effectiveness of storing, locating, and retrieving information in a hard disk data storage and retrieval system it is advantageous to optimize the transfer of information between one or more attached host computers and the hard disks stored in the data storage and retrieval system. What is needed is an apparatus and method to perform necessary hard disk maintenance operations, and to perform repetitive information transfer operations, while minimizing the use of the attached host computer systems.

SUMMARY OF THE INVENTION

Applicant's invention includes a data storage and retrieval system comprising one or more hard disks individually disposed in one or more portable hard disk drive units, one or more moveable accessors, a first information transfer station, and a first communication link interconnecting one or more first servers and the first information transfer station. Applicants' data storage and retrieval system further includes a second information transfer station, and a second communication link interconnecting one or more second servers and the second information transfer station. One or more of the portable hard disk drive units include an information connector and a power connector such that the portable hard disk drive unit can be releaseably coupled to the first information transfer station or to the second information transfer station.

In certain embodiments, Applicants' data storage and retrieval system includes one or more accessors having a memory device, a gripper mechanism, and an information connector disposed on that gripper mechanism, where that information connector is in communication with the memory device, and where that information connector can be releaseably coupled to either the first information transfer station, or to the second information transfer station.

Applicants' invention further includes a method to perform disk operations requested by one or more first servers, i.e. one or more host computer systems, on one or more hard disks using one or more second servers. Applicants' invention further includes a method to store information on one or more hard disks using Applicants' data storage and retrieval system. Applicants' invention further includes a method to locate, retrieve, and provide to one or more first servers information stored on one or more hard disks using one or more second servers. Applicants' invention further includes a method to transfer information from one or more first servers to one or more second servers using Applicants' data storage and retrieval system.

BRIEF DESCRIPTION OF THE DRAWINGS

The invention will be better understood from a reading of the following detailed description taken in conjunction with the drawings in which like reference designators are used to designate like elements, and in which:

FIG. 1 is a perspective view of one embodiment of Applicant's data storage and retrieval system;

FIG. 2A is a schematic showing a first embodiment of Applicants' distributed control network used in certain embodiments of Applicants' data storage and retrieval system;

FIG. 2B is a schematic showing a second embodiment of Applicants' distributed control network used in certain embodiments of Applicants' data storage and retrieval system;

FIG. 2C is a schematic showing a third embodiment of Applicants' distributed control network used in certain embodiments of Applicants' data storage and retrieval system;

DETAILED DESCRIPTION OF THE PREFERRED EMBODIMENTS

Figure 3A:
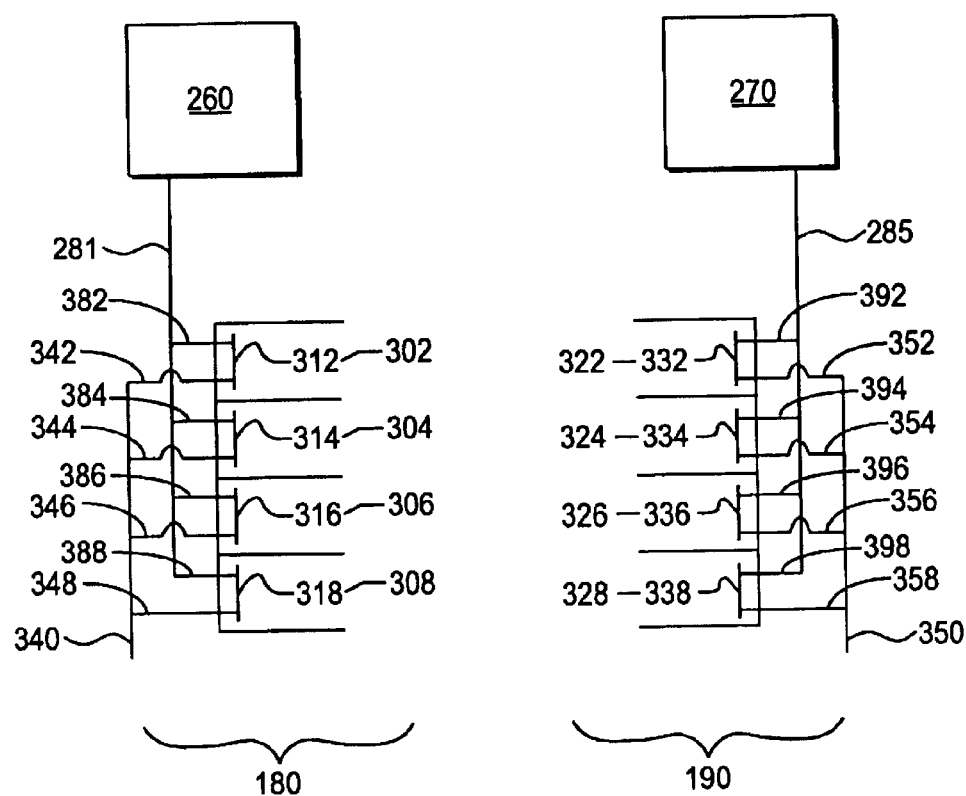
FIG. 3A is a block diagram showing one embodiment of Applicants' data storage and retrieval system.

Referring to the illustrations, like numerals correspond to like parts depicted in the figures. The invention will be described as embodied in an automated data storage and retrieval subsystem for use in a data processing environment. The following description of Applicant's apparatus and method is not meant, however, to limit Applicant's invention to hard disk drive libraries, or to data processing applications, as the invention herein can be applied to data storage and retrieval systems in general.

Referring to FIG. 1, embodiment 100 of Applicant's automated data storage and retrieval system includes a plurality of storage slots 172 disposed in storage wall 170. Each of the plurality of storage slots 172 includes an open end disposed in side 174. Applicants' data storage and retrieval system 100 further includes first information transfer station 180 which includes a plurality of information transfer slots 182. Each of the plurality of information transfer slots 182 includes an open end disposed in side 184. First information transfer station 180 is interconnected with one or more first servers 198 via communication link 196. Communication link 196 is selected from the group comprising a serial interface, such as an RS-422 cable/RS-232 cable, a SCSI interconnection, an ethernet interconnection, a gigabit ethernet interconnection, a Fibre Channel interconnection, an ESCON interconnection, a local area network, a private wide area network, a public wide area network, and combinations thereof.

Applicants' data storage and retrieval system 100 further includes second information transfer station 190 which includes a plurality of information transfer slots 192. Each of the plurality of information transfer slots 192 includes an open end disposed in side 194. Second information transfer station 190 is interconnected with one or more second servers 199 via communication link 197. Communication link 197 is selected from the group comprising a serial interface, such as an RS-422 cable/RS-232 cable, a SCSI interconnection, an ethernet interconnection, a gigabit ethernet interconnection, a Fibre Channel interconnection, an ESCON interconnection, a local area network, a private wide area network, a public wide area network, and combinations thereof.

Applicant's automated data storage and retrieval system 100 further includes one or more accessors, such as accessors 110 and 120. Accessors 110 and 120 are moveably disposed on rail system 130. Rail system 130 is disposed adjacent sides 174, 184 and 194. U.S. Pat. No. 6,038,490, entitled "Automated Data Storage Dual Picker Interference Avoidance," teaches a method to prevent collisions occurring between accessors moveably disposed on the same rail system, and is hereby incorporated by reference herein.

Accessors 110 and 120 comprise robotic devices which retrieve portable data storage media disposed in storage slots 172. Accessor 110/120 then delivers such an accessed portable data storage medium to one of the plurality of first information transfer slots 182, or to one of the plurality of second information transfer slots 192, for reading and/or writing information thereon, and then returns that accessed data storage medium to its designated storage slot.

Accessor 110 includes lifting servo section 112 which is moveable in the +/−Z direction. Lifting servo section 112 includes at least one gripper mechanism (not shown in FIG. 1). Accessor 110 further includes carriage portion 114 which is moveable in the +/−X direction. Accessor 120 includes lifting servo section 122 which is moveable in the +/−Z direction. Lifting servo section 122 includes at least one gripper mechanism (not shown in FIG. 1). Accessor 120 further includes carriage portion 124 which is moveable in the +/−X direction.

Figure 3B:
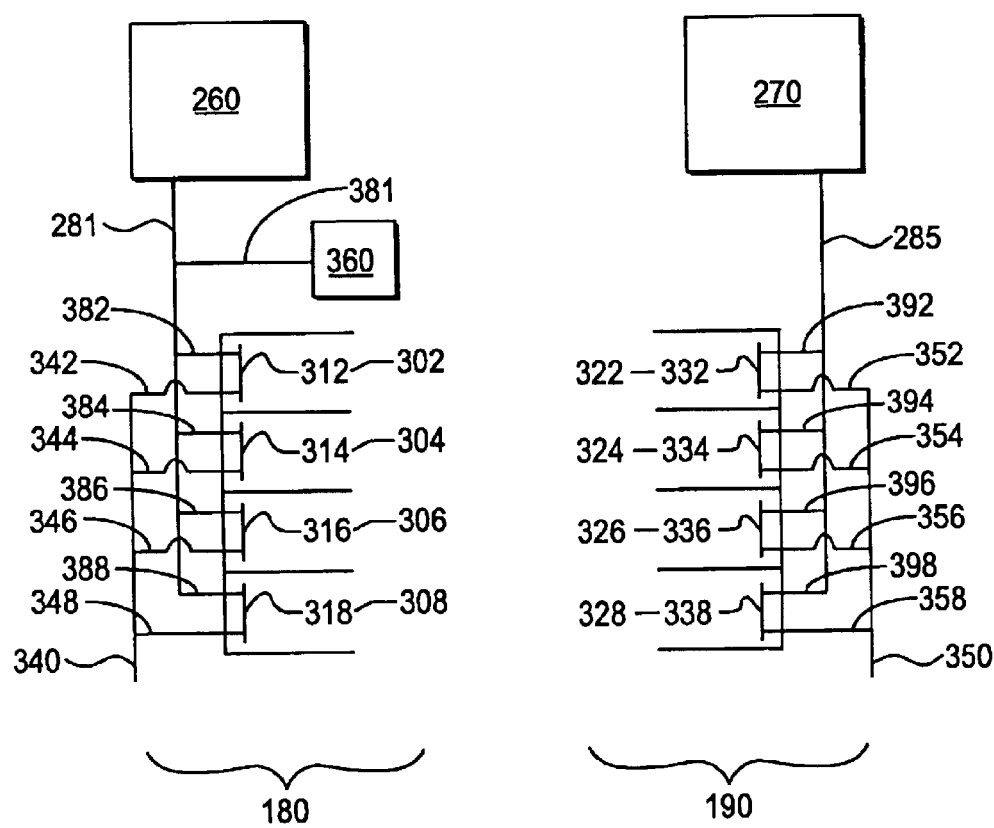
FIG. 3B is a block diagram showing a second embodiment of Applicants' data storage and retrieval system.
Figure 3C:
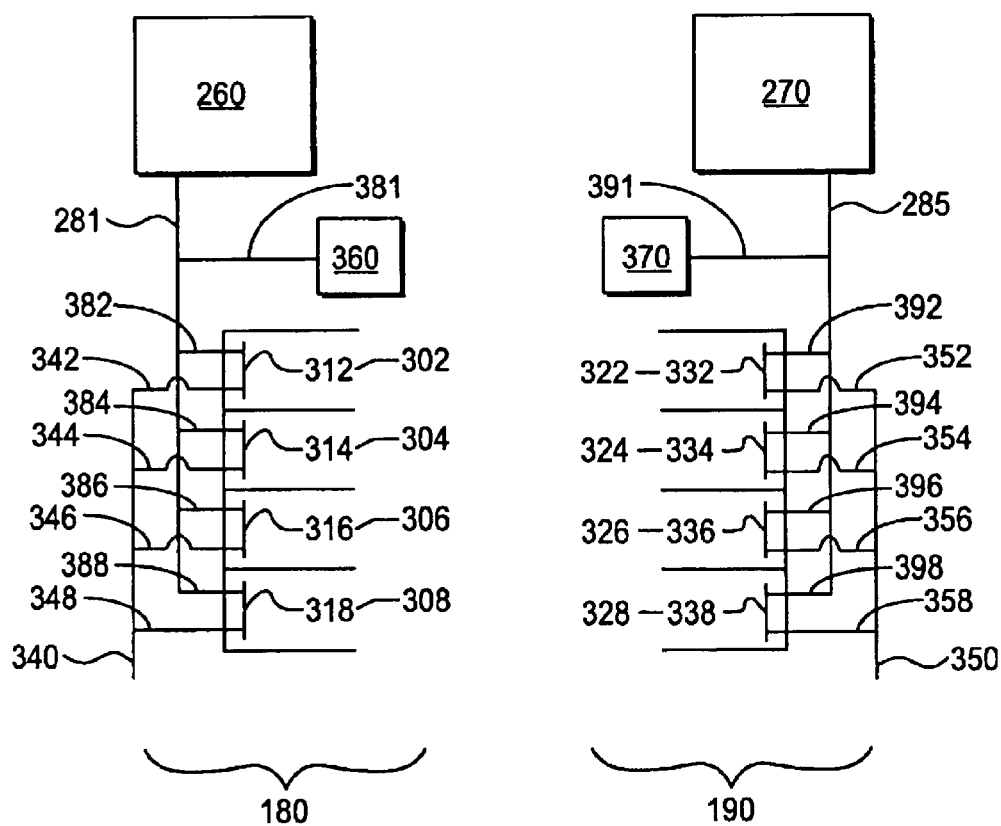
FIG. 3C is a block diagram showing a third embodiment of Applicants' data storage and retrieval system.

Operator input station 140 permits a user to communicate with Applicant's automated data storage and retrieval system 100. One or more power supply units (not shown in FIG. 1) supply power to accessors 110 and 120, and to each of the plurality of first information transfer slots 182 and second information transfer slots 192, via one or more power buses, such as power bus 340 (FIGS. 3A, 3B, 3C) and power bus 350 (FIGS. 3A, 3B, 3C). Power bus 340 provides power to first information transfer station 180, and power bus 350 provides power to second information transfer station 190. Import/export station 160 allows portable data storage media to be added to, or removed from, data storage and retrieval system 100. Accessor 110/120 moves data storage media from slots 172 to station 160 for export, and moves data storage media to slots 172 from station 160 for import.

In certain embodiments, data storage and retrieval system 100 includes library controller 150. In other embodiments discussed below, data storage and retrieval system 100 utilizes a distributed control network. Library controller 150 controls the operation of, among other things, accessors 110 and 120. In certain embodiments, library controller 150 communicates with one or more first servers 260 (FIGS. 2A, 2B, 2C, 3A, 3B, 3C) and/or one or more second servers 270 (FIG. FIGS. 2A, 2B, 2C, 3A, 3B, 3C).

In certain embodiments, first servers 260 comprise one or more host computer systems. These one or more host computer systems comprise one or more mainframe computer, one or more work stations, one or more personal computers, and combinations thereof. In certain embodiments, first servers 260 each include one or more information input devices, such as a keyboard, mouse, pointing device, and the like, one or more information output devices, such as a monitor, printer, and the like, and one or more information storage devices, such as a hard disk/hard disk drive, optical disk/optical disk drive, and the like.

In certain embodiments, each of first servers 260 includes a high level operating system such as Windows, AIX, Unix, MVS, LINUX, etc. (Windows is a registered trademark of Microsoft Corporation; AIX is a registered trademark and MVS is a trademark of IBM Corporation; and UNIX is a registered trademark in the United States and other countries licensed exclusively through The Open Group.) In certain embodiments, each first server further includes a storage management program to manage the transfer of data to/from a library, such as library 100. Such a storage management program may include the IBM DFSMS implemented in the IBM MVS operating system. The IBM DFSMS software is described in "DFSMS/MVS V1R4 General Information," IBM document no. GC26-4900-05, published by IBM (Copyright 1997, IBM), which publication is incorporated herein by reference in its entirety. Such storage management software maintains information regarding the library wherein a particular volume serial number cartridge/medium is located. Such storage management software also includes information regarding the read/write resources available in each of the attached libraries.

In certain embodiments, second servers 270 comprise second "tier" servers which do not include all the information input, information output, information storage, and/or data management, capabilities of the first servers 260. As those skilled in the art will appreciate, each of second servers 270 may cost less to purchase, maintain, and operate, than does each of first servers 260.

Referring now to FIG. 2A, in certain embodiments Applicants' data storage and retrieval system includes a distributed control network. In these distributed control embodiments, lifting servo sections 112/122 each include an accessor control card 220, carriage assemblies 114/124 each include an X/Y movement control card 240, device 150 comprises a motion card pack which includes media changer control card 230, and operator control panel 140 includes operator panel control card 250.

FIG. 2A shows a first embodiment of Applicants' distributed control network. Communication link 210 is disposed within Applicants' automated data storage and retrieval system 100 and interconnects accessor control card 220, X/Y movement control card 240, media changer control card 230, and operator panel control card 250. In certain embodiments of Applicants' invention communication link 210 comprises an ethernet bus. In certain embodiments of Applicants' invention communication link 210 comprises a gigabit ethernet bus. In other embodiments, communication link 210 comprises a CanBUS bus.

In certain embodiments, accessor control card 220 includes memory device 222. Memory device 222 is selected from the group comprising a hard disk/hard disk drive combination, a floppy disk/floppy disk drive combination, an optical disk/optical disk drive combination, an IBM Microdrive, a PCMCIA miniature storage drive such as manufactured by Calluna, and solid state nonvolatile memory devices including an erasable programmable read-only memory (EEPROM), an electrically erasable programmable read-only memory (EEPROM), battery backup RAM, and the like.

One or more first servers 260 communicate with first information transfer station 180 via communication link 281. First information transfer station 180 communicates with media changer control card 230 via communication link 282 and port 232. In certain embodiments, one or more first servers 260 communicate directly with media changer control card 230 via communication link 283 and port 234.

One or more second servers 270 communicate with second information transfer station 190 via communication link 285. Second information transfer station 190 communicates with media changer control card 230 via communication link 286 and port 238. In certain embodiments, one or more second servers 270 communicate directly with media changer control card 230 via communication link 284 and port 236.

Communication links 281, 282, 283, 284, 286, and 286, are selected from the group comprising a serial interface, such as an RS-422 cable/RS-232 cable, a SCSI interconnection, an ethernet interconnection, a gigabit ethernet interconnection, a Fibre Channel interconnection, an ESCON interconnection, a local area network, a private wide area network, a public wide area network, and combinations thereof.

FIG. 2B shows a second embodiment of Applicant's distributed control network. Accessor control card 220 includes wireless communication device 221. Media changer control card 230 includes wireless communication device 231. Communication link 212 interconnects accessor control card 220 and X/Y movement control card 240. Communication link 214 interconnects operator panel control card 250 and media changer control card 230. In certain embodiments, buses 212 and 214 comprise ethernet interconnections, gigabit ethernet interconnections, CANbus interconnections, and combinations thereof.

In this embodiment, media changer control card 230/operator panel control card 250 communicate with accessor control card 220 and/or X/Y movement control card 240 via wireless communication using wireless communication devices 221 and 231. Such wireless communication employs emissions in the infrared spectrum, emissions in the visible light spectrum, frequencies from about 1 MHz to about 10 GHz, and combinations thereof.

FIG. 2C shows a third embodiment of Applicant's distributed control network. In this embodiment, accessor control card 220 includes wireless communication device 221, media changer control card 230 includes wireless communication device 231, X/Y movement control card 240 includes wireless communication device 241, and operator panel control card 250 includes wireless communication device 251. In this embodiment, the nodes in Applicant's distributed control network communicate with one another by wireless communication. Such wireless communication employs emissions in the infrared spectrum, emissions in the visible light spectrum, frequencies from about 1 MHz to about 10 GHz, and combinations thereof.

FIG. 3A is a block diagram showing the interconnections in one embodiment of Applicants' data storage and retrieval system between first information transfer station 180, which includes first information transfer slots 302, 304, 306, and 308, and one or more first servers 260 (FIGS. 2A, 2B, 2C), and the interconnections between second information transfer station 190, which includes second information transfer slots 322, 324, 326, and 328, and one or more second servers 270 (FIGS. 2A, 2B, 2C). First information transfer slots 302, 304, 306, and 308, comprise a portion of the plurality of first information transfer slots 182 (FIG. 1) disposed in first information transfer station 180. Second information transfer slots 322, 324, 326, and 328, comprise a portion of the plurality of second information transfer slots 192 (FIG. 1) disposed in second information transfer station 190.

Information transfer slot 302 includes backplane 312. Backplane 312 is connected to one or more first servers 260 by communication link 281 (FIGS. 2A, 2B, 2C) and communication link 382. Backplane 312 is connected to power bus 340 via power link 342. Similarly, information transfer slots 304, 306, and 308 include backplanes 314, 316, and 318, respectively. Backplanes 314, 316, and 318, are connected to one or more first servers 260 by communication link 281 (FIGS. 2A, 2B, 2C) and communication links 384, 386, and 388, respectively. Backplanes 314, 316, and 318, are connected to power bus 340 via power links 344, 346, and 348, respectively.

Information transfer slot 322 includes backplane 332. Backplane 332 is connected to one or more second servers 270 by communication link 285 (FIGS. 2A, 2B, 2C) and communication link 392. Backplane 332 is connected to power bus 350 via power link 352. Similarly, information transfer slots 324, 326, and 328 include backplanes 334, 336, and 338, respectively. Backplanes 334, 336, and 338, are connected to one or more second servers 270 by communication link 285 (FIGS. 2A, 2B, 2C) and communication links 394, 396, and 398, respectively. Backplanes 334, 336, and 338, are connected to power bus 350 via power links 354, 356, and 358, respectively.

FIG. 3B shows a second embodiment of Applicants' data storage and retrieval system which includes memory device 360 and communication link 381. Communication link 381 interconnects memory device 360 and communication link 281. In certain embodiments, memory device 360 comprises a non-volatile memory device. In certain embodiments, memory device 360 comprises a hard disk drive, a floppy disk/floppy disk drive combination, an optical disk/optical disk drive combination, an IBM Microdrive, a PCMCIA memory device such as manufactured by Calluna, and solid state nonvolatile memory devices including an erasable programmable read-only memory (EPROM), an electrically erasable programmable read-only memory (EEPROM), Flash PROM, battery backup RAM, and the like. In certain embodiments, memory device 360 comprises a plurality of individual hard disks/hard disk drives comprising a redundant array of independent disks ("RAID") utilizing one or more of well-known RAID information storage protocols.

FIG. 3C shows a third embodiment of Applicants' data storage and retrieval system which includes memory device 370 and communication link 391. Communication link 391 interconnects memory device 370 and communication link 285. In certain embodiments, memory device 370 comprises a non-volatile memory device. In certain embodiments, memory device 370 comprises a hard disk drive, a floppy disk/floppy disk drive combination, an optical disk/optical disk drive combination, an IBM Microdrive, a PCMCIA memory device such as manufactured by Calluna, and solid state nonvolatile memory devices including an erasable programmable read-only memory (EPROM), an electrically erasable programmable read-only memory (EEPROM), Flash PROM, battery backup RAM, and the like. In certain embodiments, memory device 370 comprises a plurality of individual hard disks/hard disk drives comprising a redundant array of independent disks ("RAID") utilizing one or more of well-known RAID information storage protocols.

Figure 4:
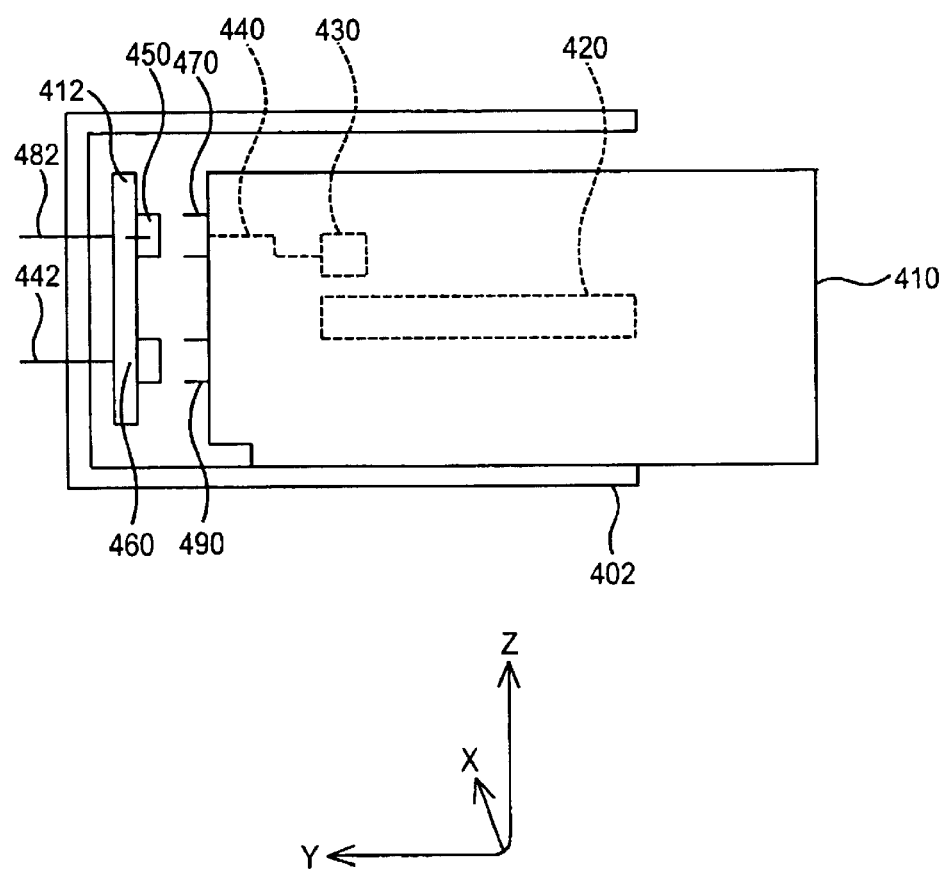
FIG. 4 is side view of Applicants' information transfer slot.

FIG. 4 shows portable hard disk drive unit 410 removeably disposed in information transfer slot 402. Information transfer slot 402 can comprise one of the plurality of first information transfer slots 182, or one of the plurality of second information transfer slots 192. Hard disk drive unit 410 includes hard disk 420, read/write head 430, communication link 440, information connector 470, and power connector 490. Communication link 440 interconnects read/write head 430 and information connector 470.

In certain embodiments, hard disk 420 comprises a magnetic hard disk. In certain embodiments, read/write head 430 comprises a giant magneto-resistive (GMR) read, and thin-film (TF) magnetic write, head. In certain embodiments, hard disk 420 comprises a magneto-optical disk. In certain embodiments, hard disk 420 comprises a phase change disk. In certain embodiments, read/write head 430 comprises a laser, focus lens, and photodetector. In certain embodiments, read/write head 430 comprises a magnetic tunnel-junction (MTJ) read head. In certain embodiments, read/write head 430 comprises a near field recording (NFR) head.

Information transfer slot 402 includes backplane 412, information connector 450 disposed on backplane 412, power connector 460 disposed on backplane 412, communication link 482, and power cable 442. In certain embodiments, communication link 482 interconnects information connector 450 and, for example, communication link 281 (FIGS. 2A, 2B, 2C, 3A, 3B, 3C). In certain embodiments, communication link 482 interconnects information connector 450 and, for example, communication link 285 (FIGS. 2A, 2B, 2C, 3A, 3B, 3C). In certain embodiments, power cable 442 interconnects power connector 460 and power bus 340 (FIGS. 3A, 3B, 3C). In certain embodiments, power cable 442 interconnects power connector 460 and power bus 350 (FIGS. 3A, 3B, 3C).

Information connector 450 and information connector 470 are designed to releaseably couple to one another when hard disk drive unit 410 is moved in the +Y direction to the rear portion of information transfer slot 402. In certain embodiments, information connector 470 comprises a module plug-in connector, and information connector 450 comprises a backplane plug-in connector. In certain embodiments of Applicants' invention, connector 470 has a "male" configuration and connector 450 has a "female" configuration. In other embodiments, connector 470 has a "female" configuration and connector 450 has a "male" configuration. As those skilled in the art will appreciate, releaseably coupling information connectors 450 and 470 effectively releaseably couples hard disk 420 and the information transfer station which includes information transfer slot 402.

Similarly, power connector 460 and power connector 490 are designed to releaseably couple to one another when hard disk drive unit 410 is moved in the +Y direction to the read portion of information transfer slot 402. In certain embodiments, power connector 490 comprises a module plug-in connector, and power connector 460 comprises a backplane plug-in connector. In certain embodiments of Applicants' invention, connector 490 has a "male" configuration and connector 460 has a "female" configuration. In other embodiments, connector 490 has a "female" configuration and connector 460 has a "male" configuration.

Referring now to FIGS. 3A, 3B, 3C, 4, in certain embodiments information transfer slot 402 (FIG. 4) comprises, for example, information transfer slot 302 (FIG. 3). In these embodiments, communication link 482 (FIG. 4) comprises communication link 382 (FIG. 3), and power cable 442 (FIG. 4) comprises power cable 342 (FIG. 3). In these embodiments, one or more of first servers 260 (FIGS. 2A, 2B, 2C, 3A, 3B, 3C) can read information from, and/or write information to, hard disk 410 (FIG. 4) via communication links 281 (FIG. 3A), 482 (FIG. 4), 440 (FIG. 4), and read/write head 430 (FIG. 4). Communication links 440 and 482 are interconnected via information connectors 450 (FIG. 4) and 470 (FIG. 4). In these embodiments, hard disk drive unit 410 receives power via power connectors 460 (FIG. 4)/490 (FIG. 4), power cable 442 (FIG. 4), and power bus 340 (FIG. 3A).

Referring again to FIGS. 3A, 3B, 3C, and 4, in certain embodiments information transfer slot 402 (FIG. 4) comprises, for example, information transfer slot 322 (FIG. 3). In these embodiments, communication link 482 (FIG. 4) comprises communication link 392 (FIG. 3), and power cable 442 (FIG. 4) comprises power cable 352 (FIG. 3). In these embodiments, one or more of second servers 270 (FIGS. 2A, 2B, 2C, 3A, 3B, 3C) can read information from, and/or write information to, hard disk 410 (FIG. 4) via communication links 285 (FIG. 3A), 482 (FIG. 4), 440 (FIG. 4), and read/write head 430 (FIG. 4). Communication links 440 (FIG. 4) and 482 (FIG. 4) are interconnected via information connectors 450 (FIG. 4) and 470 (FIG. 4). In these embodiments, hard disk drive unit 410 receives power via power connectors 460 (FIG. 4)/490 (FIG. 4), power cable 442 (FIG. 4), and power bus 350 (FIG. 3A).

Figure 5:
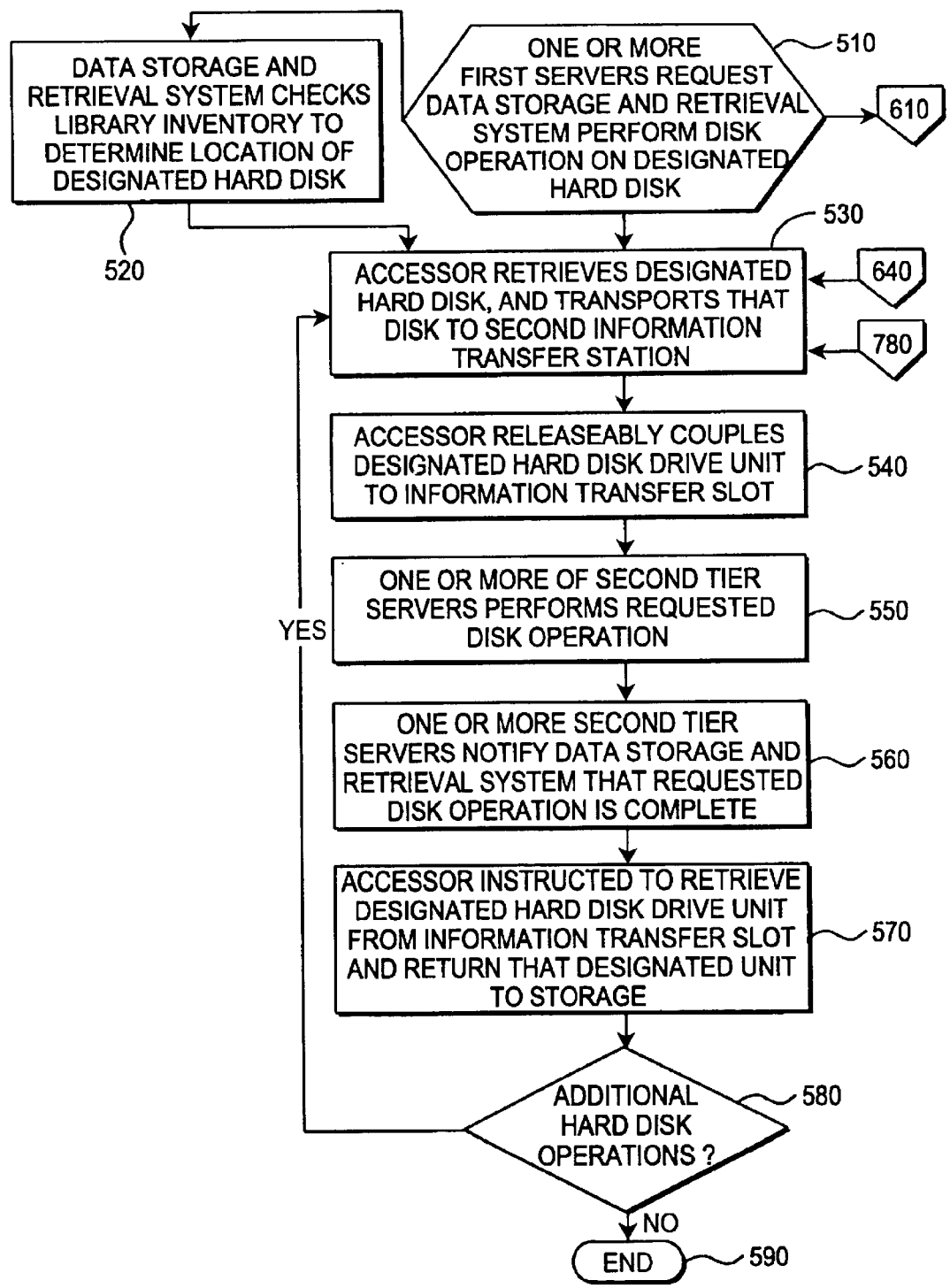
FIG. 5 is a flow chart summarizing the steps of Applicants' method to perform disk operations requested by one or more first servers using one or more second servers.

Applicants' invention includes a method for hard disk management and maintenance, wherein hard disk maintenance operations are performed by one or more second servers 270 rather than by one or more first servers 260. FIG. 5 shows flow chart 500 which summarizes the steps of Applicants' method to perform disk operations requested by one or more first servers using one or more second servers.

In step 510, one or more first servers, such as first server(s) 260 (FIGS. 2A, 2B, 2C, 3A, 3B, 3C) request Applicants' data storage and retrieval system, such as system 100 (FIG. 1), to perform a disk operation using one or more designated hard disks disposed in one or more portable hard disk drive units moveably disposed in Applicants' data storage and retrieval system. In certain embodiments of Applicants' invention, Applicants' method includes step 520. In other embodiments, Applicants' method transitions to step 530 from step 510.

In step 520, the data storage and retrieval system checks its library inventory to determine the location of the designated hard disk. Referring to FIGS. 3B and 3C, in certain embodiments Applicants' data storage and retrieval system includes memory device 360 which is interconnected with one or more first servers 260. In certain of these embodiments, memory device 360 includes a library inventory which includes information regarding, among other things, the storage location(s) of the each of the one or more hard disks stored in Applicants' data storage and retrieval system. In these embodiments, in step 520 the data storage and retrieval system checks the library inventory stored in device 360 to determine the location of the designated hard disk(s).

In step 530, an accessor moveably disposed in the data storage and retrieval system retrieves one of the one or more designated hard disks, and transports that designated hard disk to an information transfer slot, such as information transfer slot 402 (FIG. 4), disposed in the an information transfer station, such as second information transfer station 190 (FIG. 1), which is in communication with one or more second servers 270 (FIGS. 2A, 2B, 2C, 3A, 3B, 3C). In step 540, the accessor releaseably couples the hard disk drive unit to the information transfer slot.

In additional embodiments, the requested disk operation includes, for example, sorting and processing a database, such as a Lotus*.123 database. In other embodiments, for example, the requested disk operation includes the rebuild of a failed disk drive of a RAID. For RAID 3, 4, and 5, this requires a parity calculation using the data read by one or more second servers, such as one or more second servers 270 (FIGS. 2A, 2B, 2C, 3A, 3B, 3C), from the remaining members of the RAID releaseably coupled to, for example, second information transfer station 190 (FIGS. 1, 2A, 2B, 2C, 3A, 3B, 3C). The second server performs the exclusive—or (XOR) parity calculation, thus not imposing the required time/processing overhead on the one or more first servers, such as one or more first servers 260 (FIGS. 2A, 2B, 2C, 3A, 3B, 3C).

As those skilled in the art will appreciate, the smallest number of storage media in a RAID 3, 4, or 5, is three (3). Moreover, in order to rebuild a failed disk drive, a replacement disk drive unit is required. Therefore in this embodiment of Applicants' invention, one or more accessors, such as accessors 110 (FIG. 1)/120 (FIG. 1), retrieve and releaseably couple a total of (N) portable disk drive units to a second information transfer station, where (N) includes (N−1) working portable disk drive units and one (1) replacement portable disk drive unit in order to begin the reconstruction process.

In step 550, one or more second servers performs the requested disk operation. In certain embodiments, the requested disk operation includes defragmenting the designated hard disk. In certain embodiments, the requested disk operation includes formatting the designated hard disk. In certain embodiments, the requested disk operation includes, for example, running a SCANDISK program to locate disk errors, locate corrupted sectors, determine available storage capacity, and the like.

In step 560, the one or more second servers notify the data storage and retrieval system that the disk operation using the designated hard disk is complete. In step 570, an accessor retrieves the designated hard disk from the data transfer slot, and returns that designated hard disk to storage. In step 580, the data storage and retrieval system determines if there are additional disk operation requests pending for additional designated hard disks. If there are additional disk operations pending, then Applicants' method transitions to step 530. If there are no additional disk operations pending, then Applicants' method transitions to step 590 and ends.

Figure 6:
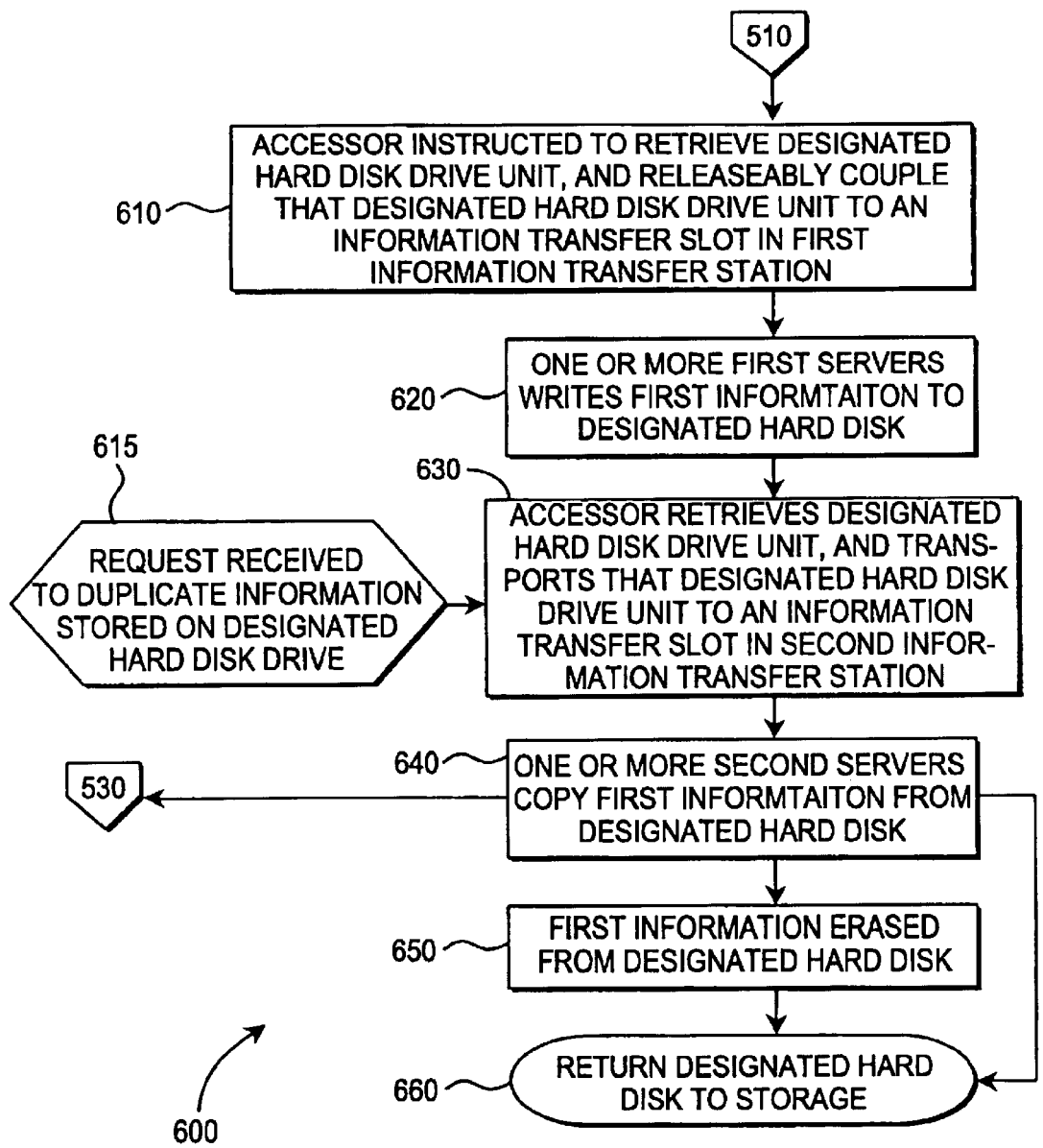
FIG. 6 is a flow chart summarizing the steps of Applicants' method to store information on one or more hard disks disposed in Applicants' data storage and retrieval system.

Referring now to FIG. 6, flow chart 600 summarizes additional steps in Applicants' method. In certain embodiments of Applicants' method, the requested disk operation includes writing new information to one or more designated hard disks. In these embodiments, Applicants' method transitions to step 610 after step 510 (FIG. 5). In step 610, an accessor retrieves a designated hard disk drive unit disposed in Applicants' data storage and retrieval system, transports that designated hard disk to an information transfer slot in communication with the one or more first servers, and releaseably couples that designated hard disk drive unit to the designated information transfer slot.

In embodiments of Applicants' method wherein information provided by one or more first servers is written to a plurality of hard disks using one or more second servers, the designated hard disk of steps 610, 620, 630, and 640, comprises an information transfer hard disk. An information transfer hard disk comprises a hard disk/hard disk drive unit disposed in Applicants' data storage and retrieval system, where the hard disk contains essentially no information stored thereon. As those skilled in the art will appreciate, Applicants' transfer hard disk may have minimal quantities of information stored thereon in, for example, a boot sector of that hard disk.

In certain embodiments, the one or more first servers designate an accessor and cause that accessor to retrieve, transport, and releaseably couple, a transfer hard disk. In certain embodiments, one or more first servers request the data storage and retrieval system to designate an accessor and cause that accessor to retrieve, transport, and releaseably couple, a transfer hard disk.

In step 620, one or more first servers write first information to the releaseably coupled transfer hard disk. In certain embodiments, the first information comprises a hard disk operating system. In certain embodiments, the first information comprises one or more file management programs.

In step 630, an accessor retrieves the transfer hard disk containing the first information, transports that transfer hard disk to an information transfer slot in communication with one or more second servers, and releaseably couples that transfer hard disk to that information transfer slot. In certain embodiments, the one or more first servers designate an accessor and cause that accessor to retrieve, transport, and releaseably couple, the transfer hard disk to the second information transfer station. In certain embodiments, one or more first servers request the data storage and retrieval system designate an accessor and cause that accessor to retrieve, transport, and releaseably couple, the transfer hard disk to the second information transfer station. In step 640, one or more second servers copy the first information from the transfer hard disk.

In certain embodiments of Applicants' invention, Applicants' method transitions to step 650 after step 640, for example, when the disk media is magneto-optical and needs to be erased prior to being written with new data, or when security protocols require erasure of data on the designated hard disk. In certain embodiments, Applicants' method transitions to step 530 after step 640. In certain embodiments, Applicants' method transitions to both steps 530 and 650 after step 640. In certain embodiments of Applicants' invention, Applicants' method transitions to step 660 after step 640, especially when the disk media may be overwritten either magnetically or optically, or when security protocols do not require erasure of the data on the designated hard disk.

For example, in certain embodiments of Applicants' invention the first information stored on the one or more second servers after step 640 is written to one or more hard disks stored in Applicants' data storage and retrieval system. In these embodiments, Applicants' method transitions to step 530 from step 640. In these embodiments, the disk operation of steps 550, 560, and 580, includes writing the first information to each of one or more designated hard disks disposed in Applicants' data storage and retrieval system. Thus in these embodiments, in steps 530, 540, 550, 560, 570, 580, and 590, the first information is copied from the one or more second servers to one or more designated hard disks moveably disposed in Applicants' data storage and retrieval system.

In certain embodiments of Applicants' invention, after step 640 Applicants' method transitions to step 650 wherein the first information is erased from the transfer hard disk. In step 660, that transfer hard disk is returned to storage. This embodiment of Applicants' method can be used, for example, to upgrade one or more second servers to one or more first servers by, among other things, changing the server operating system. In this embodiment of Applicants' method, the first information comprises a server operating system.

Applicants' invention includes a method using Applicants' data storage and retrieval system to duplicate designated information stored on one or more hard disks disposed in Applicants' data storage and retrieval system. In this embodiment, the designated hard disk of steps 615, 630, 640, and 660, comprises an information source hard disk. Referring again to FIG. 6, in step 615 one or more first servers request Applicants' data storage and retrieval system duplicate first information stored on a source hard disk disposed in Applicants' system. Thereafter, this embodiment of Applicants' method transitions to step 630.

In step 630, an accessor, such as accessor 110/120 (FIG. 1), retrieves the source hard disk containing the first information, transports that source hard disk to an information transfer slot in communication with one or more second servers, and releaseably couples that source hard disk to that information transfer slot. In certain embodiments, the one or more first servers designate an accessor and cause that accessor to retrieve, transport, and releaseably couple, the source hard disk to the second information transfer station. In certain embodiments, one or more first servers request the data storage and retrieval system designate an accessor and cause that accessor to retrieve, transport, and releaseably couple, the source hard disk to the second information transfer station.

In step 640, one or more second servers copy the first information from the source hard disk. Thereafter, this embodiment of Applicants' method transitions to steps 530 and 660 from step 640. In step 660, the source hard disk is returned to storage. In steps 530, 540, 550, 560, 570, 580, and 590, the first information is copied from the one or more second servers to one or more designated hard disks moveably disposed in Applicants' data storage and retrieval system.

In certain embodiments of Applicants' method, one or more first servers request Applicants' data storage and retrieval system first locate, retrieve, provide, and in certain embodiments copy, designated information stored on one or more portable hard disks stored in Applicants' data storage and retrieval system. Rather than utilize the time and resources of the first servers, Applicants' method utilizes one or more second servers to locate, retrieve, and copy, that designated information.

FIG. 700 shows flow chart 700 which summarizes the steps in Applicants' method to locate, retrieve, provide, and copy, designated information. In step 710, one or more first servers request Applicants' data storage and retrieval system locate certain designated information. In order to first locate that designated information, either the one or more first servers, or Applicants' data storage and retrieval system, selects one or more hard disks that might contain the designated information. In step 720, an accessor retrieves one of those selected hard disks, transports that selected hard disk/hard disk drive unit, and releaseably couples the hard disk drive unit housing that selected hard disk to an information slot, such as slot 322 (FIGS. 3A, 3B, 3C) disposed in the second information transfer station, such as information transfer station 190 (FIGS. 1, 2A, 2B, 2C, 3A, 3B, 3C). In certain embodiments, the one or more first servers select which hard disk to retrieve, transport, and releaseably couple, to the second information transfer station. In certain embodiments, Applicants' data storage and retrieval system selects which hard disk to retrieve, transport, and releaseably couple, to the second information transfer station.

In step 730, one or more second servers determine if the designated information is stored on the selected hard disk. In the event the designated information is not located on the selected hard disk, then Applicants' method transitions to step 720 wherein another hard disk is selected, transported, and releaseably coupled to the second information transfer station.

In the event the designated information is located on the selected hard disk, then Applicants' method transitions to step 740 wherein Applicants' system determines if the one or more first servers request that duplicates of the designated information be made. In the event the one or more first servers request Applicants' system make one or more duplicates of the designated information, then Applicants' method transitions to step 780 wherein one or more second servers copy the designated information. In this embodiment, Applicants' method then transitions to step 530. Thereafter, in steps 530, 540, 550, 560, 570, 580, and 590, the designated information is copied from the one or more second servers to one or more designated hard disks moveably disposed in Applicants' data storage and retrieval system.

In the event Applicants' system determines in step 740 that one or more duplicates of the designated information are not requested, then Applicants' method transitions to step 750 wherein an accessor retrieves the selected hard disk, transports that selected hard disk to the first information transfer station, and releaseably couples that selected hard disk to an information transfer slot disposed in the first information transfer station. Thereafter, in step 760, one or more first servers copies the designated information from the selected hard disk. In step 770, the selected hard disk is returned to storage.

In certain embodiments, Applicants' data storage and retrieval system includes one or more memory accessors. Referring again to FIGS. 2A, 2B, and 2C, Applicants' memory accessor includes memory device 222 disposed in accessor control card 220. Memory device 222 is selected from the group comprising a hard disk/hard disk drive combination, a floppy disk/floppy disk drive combination, an optical disk/optical disk drive combination, an IBM Microdrive, a PCMCIA miniature storage drive such as manufactured by Calluna, and solid state nonvolatile memory devices including an erasable programmable read-only memory (EPROM), an electrically erasable programmable read-only memory (EEPROM), battery backup RAM, and the like. Applicants' memory accessor further includes a releaseably coupleable information connector 470 (FIG. 4) disposed on one or more gripper mechanisms, and a communication link interconnecting that information connector and memory device 222.

Figure 8:
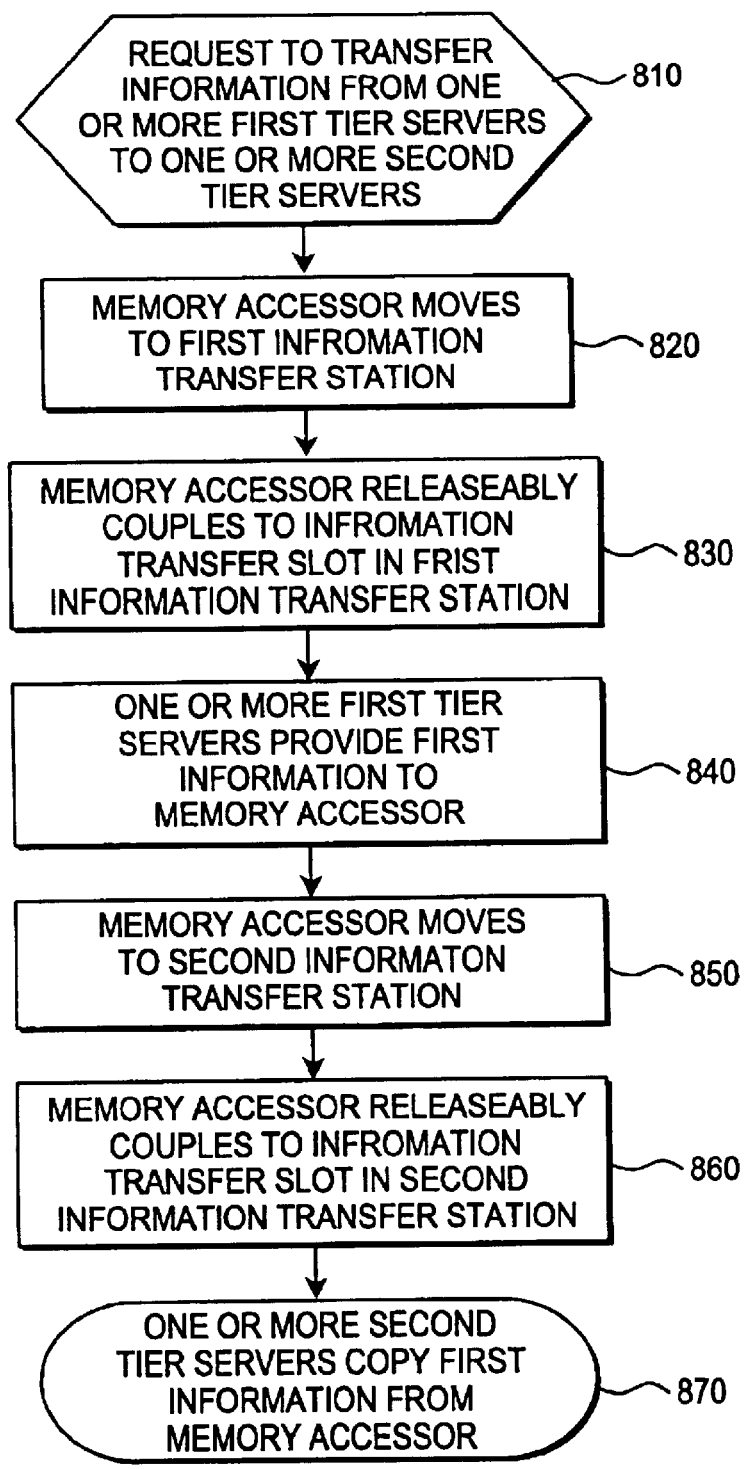
FIG. 8 is a flowchart summarizing steps in Applicants' method to transfer information from one or more first servers to one or more second servers using Applicants' data storage and retrieval system.

Applicants' memory accessor can releaseably couple the memory connector disposed on a gripper mechanism to a memory connector, such as memory connector 450 (FIG. 4), disposed in an information transfer slot, and thereby establish communication between memory device 222 and either one or more first servers 260 (FIGS. 2A, 2B, 2C, 3A, 3B, 3C), or one or more second servers 270 (FIGS. 2A, 2B, 2C, 3A, 3B, 3C). Applicants' invention includes a method to "shuttle" information between one or more first servers 260 and one or more second servers 270 using Applicants' memory accessor. FIG. 8 summarizes the steps in this embodiment of Applicants' method.

In step 810, one or more first servers requests Applicants' data storage and retrieval system transfer certain information to one or more second servers. In step 820, a memory accessor is caused to move to a first information transfer station, such as first information transfer station 180 (FIGS. 1, 2A, 2B, 2C, 3A, 3B, 3C). In step 830, Applicants' memory accessor releaseably couples to an information transfer slot, such as slot 302 (FIGS. 3A, 3B, 3C) in information transfer station 180. In step 840, one or more first servers, such as first servers 260, provide first information to the memory device, such as memory device 222 (FIGS. 2A, 2B, 2C) disposed on Applicants' accessor.

In step 850, Applicants' memory accessor moves to a second information transfer station, such as information transfer station 190 (FIGS. 1, 2A, 2B, 2C, 3A, 3B, 3C). In step 860, Applicants' memory accessor releaseably couples to an information transfer slot, such as slot 322, disposed in the second information transfer station. In step 870, one or more second servers, such as servers 270, copy the first information from the memory accessor's memory device, such as memory device 222.

Applicants' invention includes embodiments wherein Applicants' data storage and retrieval system includes two or more data storage libraries, wherein each of those data storage libraries are interconnected with one or more first servers and with one or more second servers. For example the embodiment of Applicants' invention shown in FIG. 9A includes first library 902 and second library 904. First library 902 and second library 904 are interconnected to one or more first servers 960 and to one or more second servers 970. In certain embodiments, one or more first servers 960 are configured similarly to one or more first servers 260 (FIGS. 2A, 2B, 2C, 3A, 3B, 3C). In certain embodiments, one or more second servers 970 are configured similarly to one or more second servers 270 (FIGS. 2A, 2B, 2C, 3A, 3B, 3C).

Figure 9A:
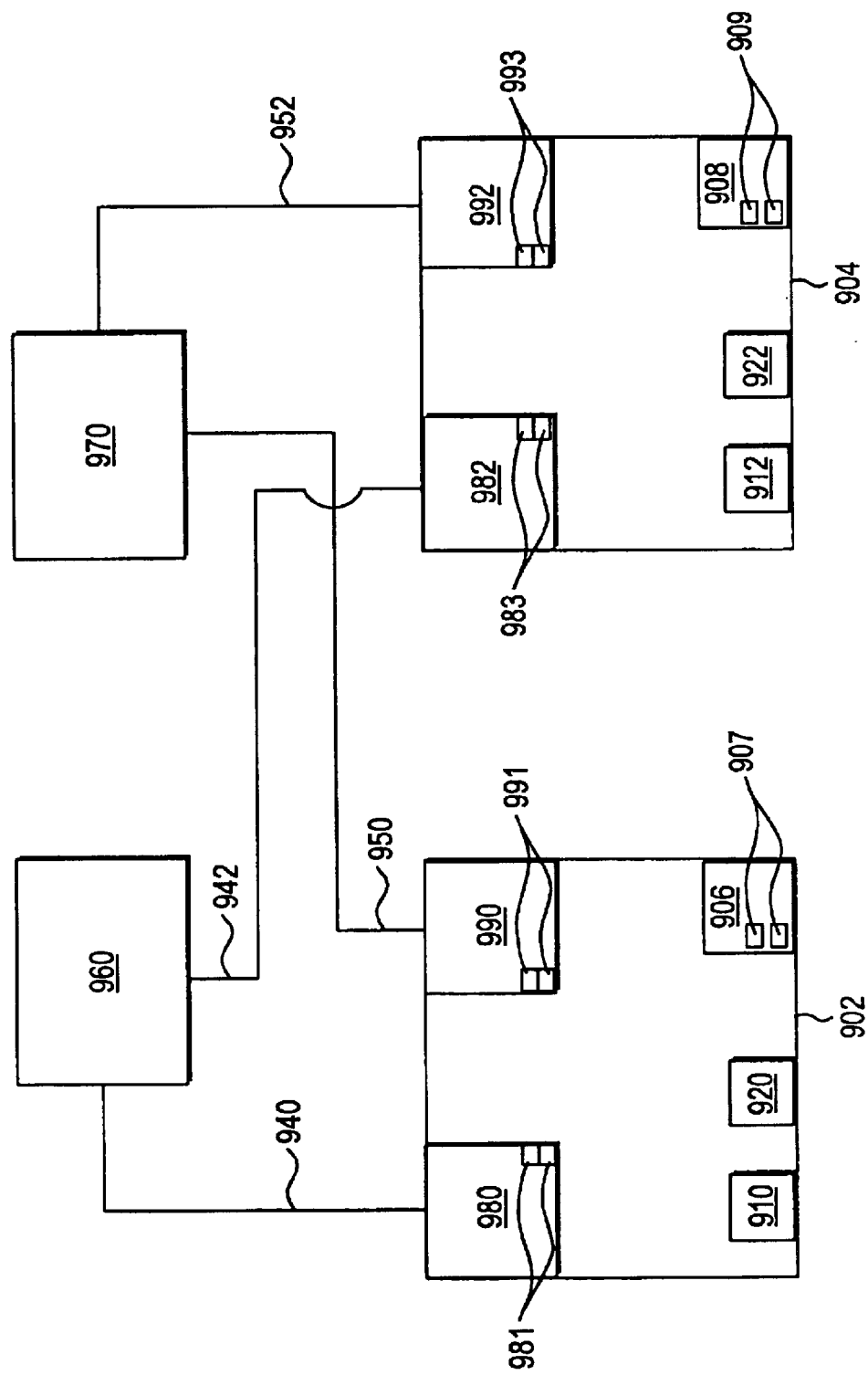
FIG. 9A shows one embodiment of Applicants' invention which includes two data storage and retrieval systems each of which is interconnected to one or more first servers and to one or more second servers.

The embodiment of Applicants' data storage and retrieval system shown in FIG. 9A includes two data storage libraries. In other embodiments, Applicants' data storage and retrieval system includes a plurality of data storage libraries, wherein each of those plurality of data storage libraries are interconnected to one or more first servers and to one or more second servers.

First data storage library 902 includes accessors 910 and 920, a plurality of storage slots 906, first information transfer station 980, and second information transfer station 990. First information transfer station 980 includes one or more information transfer slots 981. In certain embodiments, one or more of information transfer slots 981 are configured similarly to information transfer slot 402 (FIG. 4). Second information transfer station 990 includes one or more information transfer slots 991. In certain embodiments, one or more of information transfer slots 991 are configured similarly to information transfer slot 402 (FIG. 4).

First information transfer station 980 is interconnected to one or more first servers 960 via communication link 940. Second information transfer station 990 is interconnected to one or more second servers 970 via communication link 950. Communication links 940 and 950 are each individually selected from the group comprising a serial interface, such as an RS-422 cable/RS-232 cable, a SCSI interconnection, a SCSI switch, an ethernet interconnection, a gigabit ethernet interconnection, a Fibre Channel interconnection, an ESCON interconnection, a local area network, a private wide area network, a public wide area network, and combinations thereof. One or more of first portable data storage medium 907 are individually disposed in plurality of storage slots 906.

In certain embodiments, first data storage library 902 is configured similarly to data storage and retrieval system 100 (FIG. 1). In certain embodiments, first data storage library 902 utilizes one of the distributed control systems shown in FIGS. 2A, 2B, or 2C. In certain embodiments, first information transfer station 980 is configured similarly to first information transfer station 180 (FIGS. 1, 2A, 2B, 2C, 3A, 3B, 3C). In certain embodiments, second information transfer station 990 is configured similarly to second information transfer station 190 (FIGS. 1, 2A, 2B, 2C, 3A, 3B, 3C).

Second data storage library 904 includes accessors 912 and 922, a plurality of storage slots 908, first information transfer station 982, and second information transfer station 992. First information transfer station 982 includes one or more information transfer slots 983. In certain embodiments, one or more of information transfer slots 983 are configured similarly to information transfer slot 402 (FIG. 4). Second information transfer station 992 includes one or more information transfer slots 993. In certain embodiments, one or more of information transfer slots 993 are configured similarly to information transfer slot 402 (FIG. 4).

First information transfer station 982 is interconnected to one or more first servers 960 via communication link 942. Second information transfer station 992 is interconnected to one or more second servers 970 via communication link 952. Communication links 942 and 952 are each individually selected from the group comprising a serial interface, such as an RS-422 cable/RS-232 cable, a SCSI interconnection, an ethernet interconnection, a gigabit ethernet interconnection, a Fibre Channel interconnection, an ESCON interconnection, a local area network, a private wide area network, a public wide area network, and combinations thereof. One or more of second portable data storage medium 909 are individually disposed in plurality of storage slots 908.

In certain embodiments, second data storage library 904 is configured similarly to data storage and retrieval system 100 (FIG. 1). In certain embodiments, second data library 904 utilizes one of the distributed control systems shown in FIGS. 2A, 2B, or 2C. In certain embodiments, first information transfer station 982 is configured similarly to first information transfer station 180 (FIGS. 1, 2A, 2B, 2C, 3A, 3B, 3C). In certain embodiments, second information transfer station 992 is configured similarly to second information transfer station 190 (FIGS. 1, 2A, 2B, 2C, 3A, 3B, 3C).

One or more of first portable data storage media 907 are selected from the group consisting of a magnetic storage medium, an optical storage medium, an electronic storage medium, and the like. By electronic storage medium, Applicants mean a device such as a PROM, EPROM, EEPROM, Flash PROM, and the like. One or more of second portable data storage media 909 are selected from the group consisting of a magnetic storage medium, an optical storage medium, an electronic storage medium, and the like. In certain embodiments, first portable data storage medium 907 is the same as second portable data storage medium 909. In certain embodiments, first portable data storage medium 907 differs from second portable data storage medium 909.

In the embodiment shown in FIG. 9A. communication links 940 and 942 comprise different data and control interconnections. In this embodiment, communication links 950 and 952 comprise different data and control interconnections. In embodiment shown in FIG. 9B, a single communication bus 944 interconnects one or more first servers 960, information transfer station 980, and information transfer station 982. In this embodiment, communication bus 954 interconnects one or more second servers 970, information transfer station 990, and information transfer station 992.

Figure 9B:
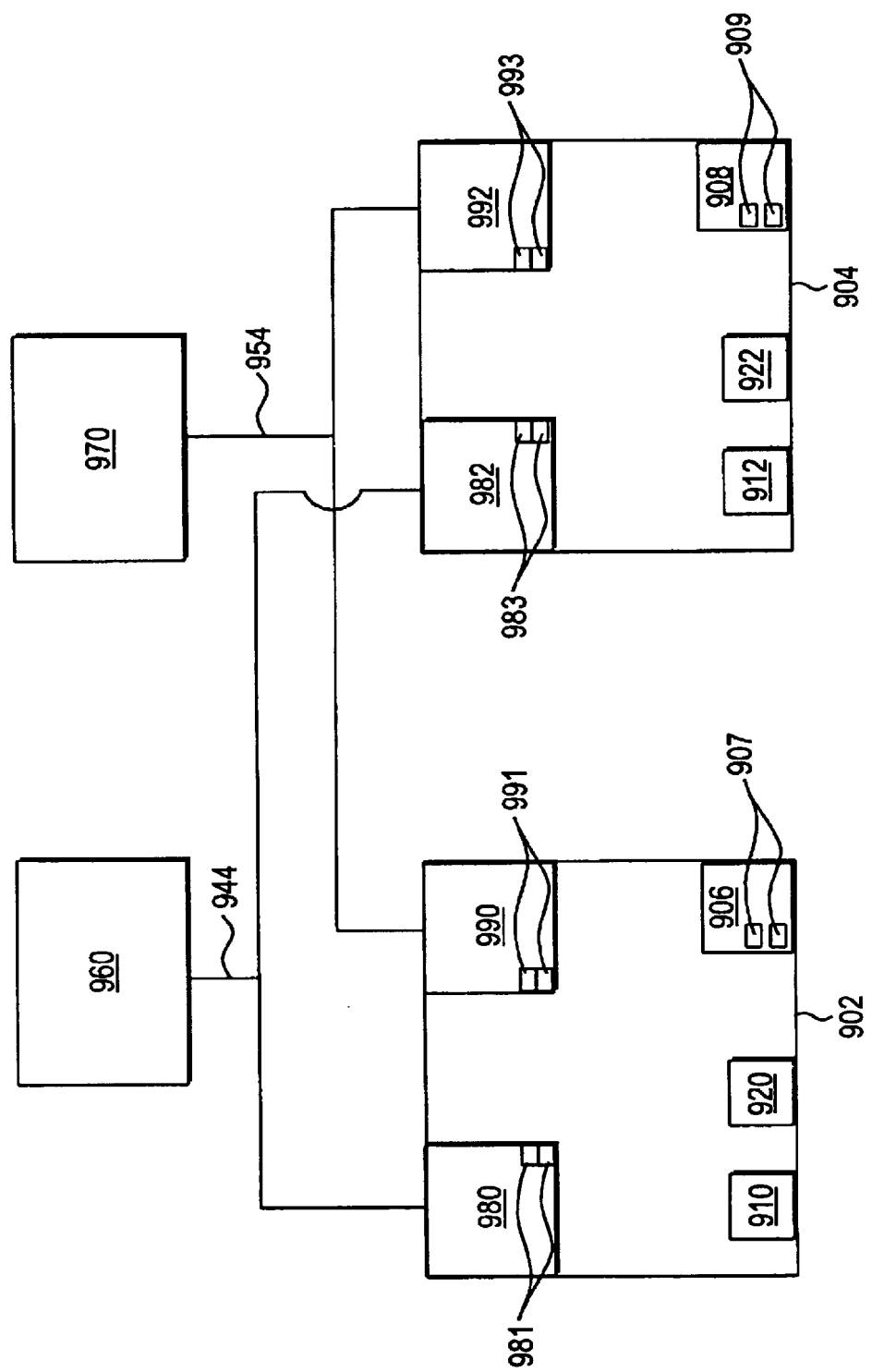
FIG. 9B shows second embodiment of Applicants' invention which includes two data storage and retrieval systems each of which is interconnected to one or more first servers and to one or more second servers.

Applicants' invention includes a method to transfer information from a first data storage library, such as data storage library 902 (FIGS. 9A, 9B), to a second data storage library, such as data storage library 904 (FIGS. 9A, 9B), using one or more first servers, such as first servers 960 (FIGS. 9A, 9B) and one or more second servers, such as second servers 970 (FIGS. 9A, 9B). In certain embodiments, certain designated information stored in the first data storage library is stored on one or more first portable data storage media, such as data storage medium 907. In accord with this embodiment of Applicants' invention, that designated information is copied to, and stored in, the second data storage library on one or more second portable data storage media 909. In certain embodiments of Applicants' method, first portable data storage medium 907 comprises the same type of storage medium, i.e. magnetic tape, magnetic disk, optical disk, electronic storage medium, and so on, as does second portable data storage medium 909. In certain embodiments of Applicants' method, first portable data storage medium 907 differs from second portable data storage medium 909.

Figure 10:
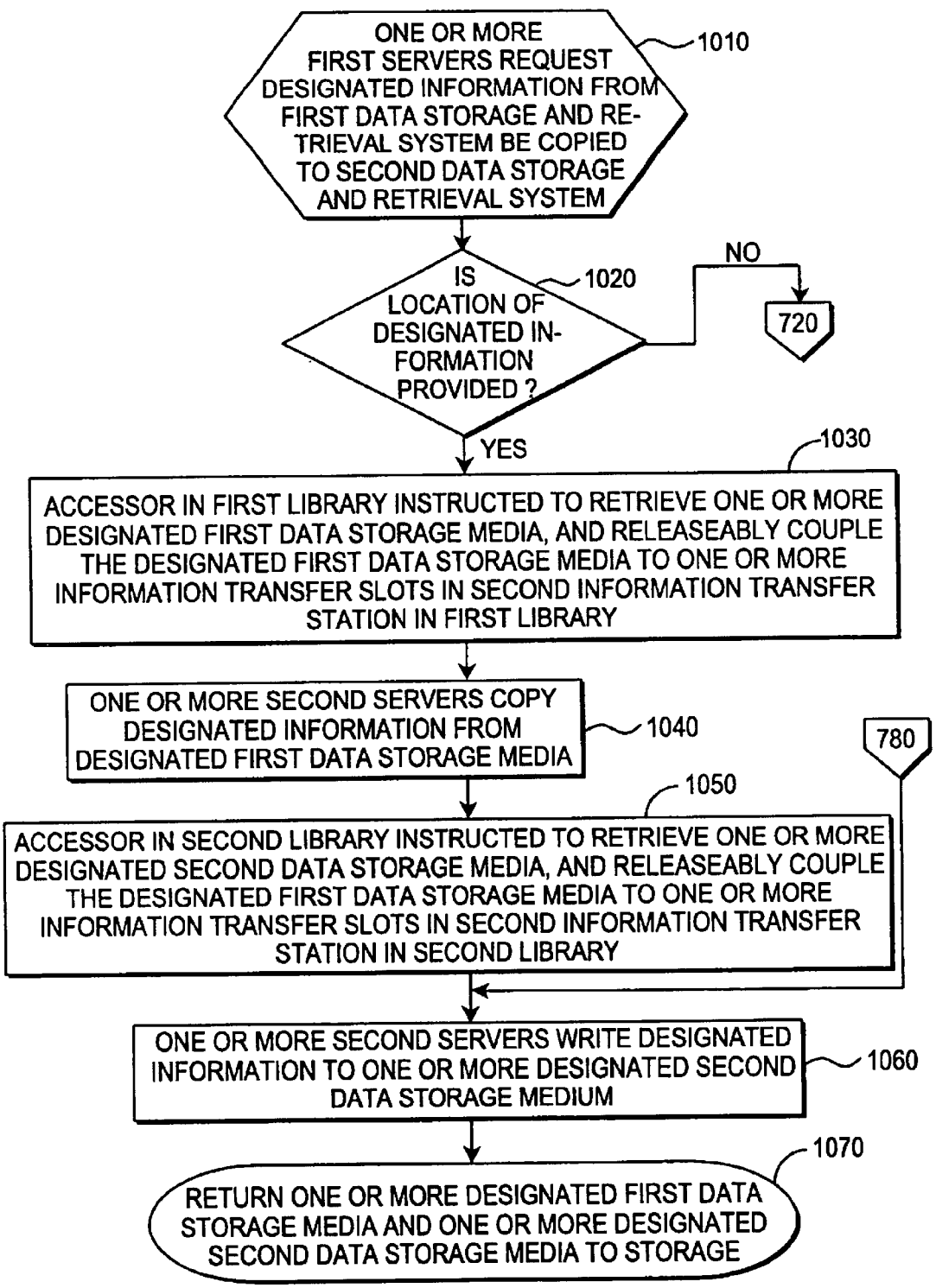
FIG. 10 is a flow chart summarizing steps in Applicants' method to transfer information from a first data storage and retrieval system to a second data storage and retrieval system using one or more first servers and one or more second servers.

Referring now to FIG. 10, in step 1010 one or more first servers, such as one or more first servers 960 (FIGS. 9A, 9B) request designated information stored in a first data storage library, such as data storage library 902 (FIGS. 9A, 9B), be copied to a second data storage library, such as data storage library 904 (FIGS. 9A, 9B). In the event it is determined in step 1020 that the one or more requesting first servers designated one or more first data storage media containing the requested information, then Applicants' method transitions to step 1030 from step 1020.

In step 1030, an accessor in the first data storage library, such as accessor 910 (FIGS. 9A, 9B), retrieves one or more designated first data storage media, such as one or more of first data storage media 907 (FIGS. 9A, 9B), and releasably couples those one or more designated data storage media to one or more information transfer slots, such as one or more of information transfer slots 991 (FIGS. 9A, 9B), disposed in a second information transfer station, such as information transfer station 990 (FIGS. 9A, 9B).

In step 1040, one or more second servers, such as one or more second servers 970 (FIGS. 9A, 9B), copy the designated information from the designated first data storage media 907. In step 1050, an accessor, such as accessor 912 (FIGS. 9A, 9B) in the second data storage library, such as data storage library 904 (FIGS. 9A, 9B), retrieves one or more designated second data storage media, such as one or more of second data storage media 909, and releasably couples those one or more second data storage media to one or more information transfer slots, such as one or more of information transfer slots 993 (FIGS. 9A, 9B), disposed in a second information transfer station disposed in that second data storage library, such as information transfer station 992 (FIGS. 9A, 9B).

In step 1060, one or more second servers write the designated information to those one or more releasably coupled second data storage media. In step 1070, the one or more designated first data storage media, such as media 907, and the one or more designated second data storage media, such as media 909, are returned to storage in their respective data storage libraries.

Figure 7:
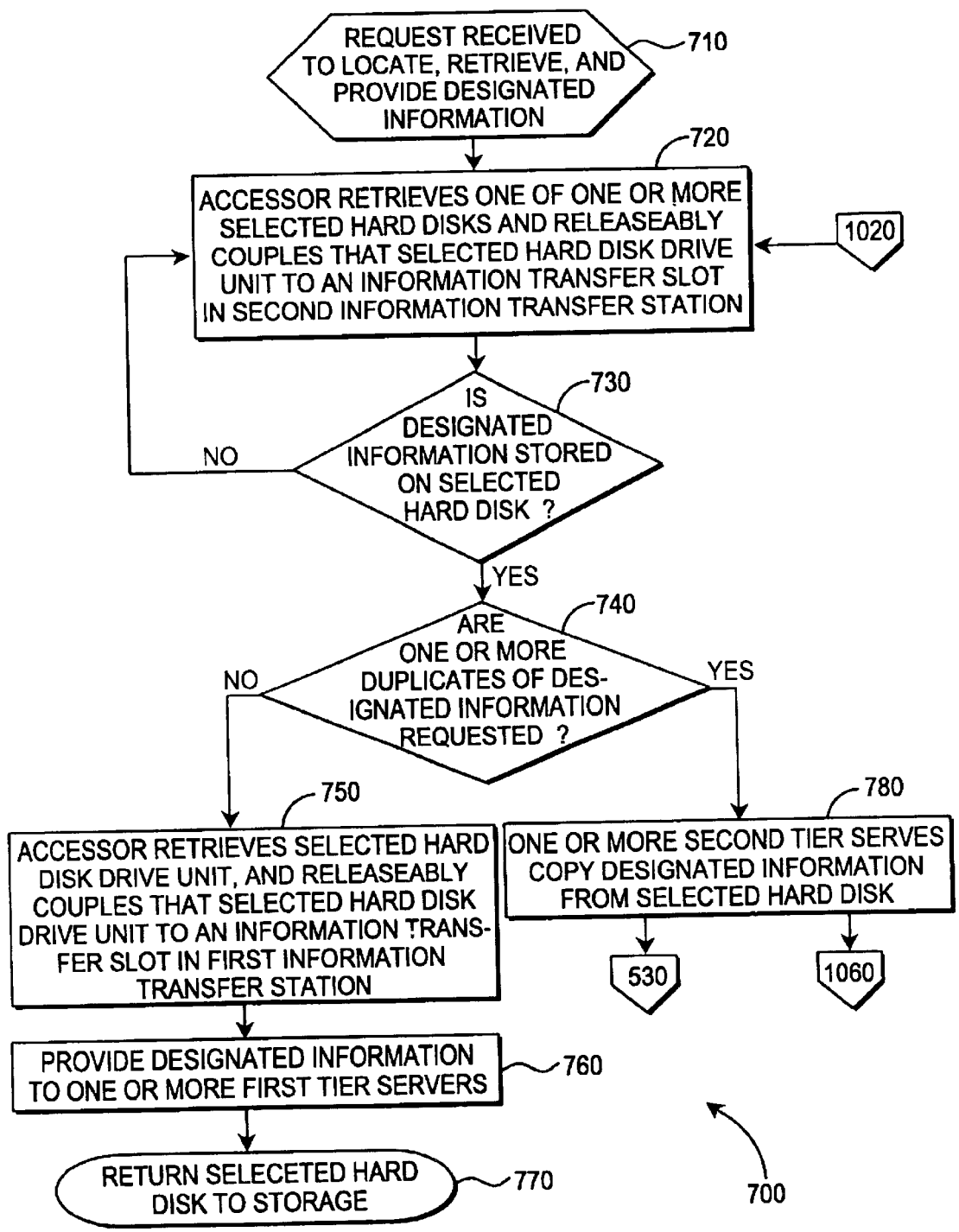
FIG. 7 is a flowchart summarizing the steps of Applicants' method to locate, retrieve, and provide, information from one or more hard disks to one or more first servers using one or more second servers.

In the event it is determined in step 1020 that the location of the designated information is not provided by the one or more first servers, then Applicants' method transitions from step 1020 to step 720 (FIG. 7). Thereafter this embodiment of Applicants' method includes steps 720, 730, 740, and 780, wherein the requested information is first located, and then copied to the one or more second servers 970 (FIGS. 9A, 9B). Thereafter, this embodiment of Applicants' method transitions from step 780 to step 1060 (FIG. 10) wherein the one or more second servers write the designated information to the one or more designated second data storage media 909 (FIGS. 9A, 9B). In step 1070, the one or more designated first portable data storage media, such as media 907, and the one or more designated second portable data storage media, such as media 909, are returned to storage in their respective data storage libraries.

Applicants' invention includes a data storage and retrieval system comprising a computer useable medium having computer readable program code disposed therein to execute one or more disk operations requested by one or more first servers using one or more second servers. Applicants' invention includes a data storage and retrieval system comprising a computer useable medium having computer readable program code disposed therein to write information provided by one or more first servers on one or more hard disks using one or more second servers. Applicants' invention includes a data storage and retrieval system comprising a computer useable medium having computer readable program code disposed therein to copy information stored on one or more hard disks using one or more second servers and then provide that information to one or more first servers. Applicants' invention includes a data storage and retrieval system comprising a computer useable medium having computer readable program code disposed therein to locate, retrieve, and copy, information requested by one or more first servers, using one or more second servers, where that requested information is stored on one or more hard disks. Applicants' invention includes a data storage and retrieval system comprising a computer useable medium having computer readable program code disposed therein to locate, retrieve, and copy, certain requested information from a first data storage library to a second data storage library using one or more second servers, where that requested information is initially stored on first portable data storage media and is copied to second portable data storage media.

The programming of the present invention may comprise a computer program product embodied as program code stored in a storage device, such as a magnetic disk drive or memory, etc., in a computer, or may comprise an article of manufacture, such as a CD ROM, magnetic tape, etc.

While the preferred embodiments of the present invention have been illustrated in detail, it should be apparent that modifications and adaptations to those embodiments may occur to one skilled in the art without departing from the scope of the present invention as set forth in the following claims.

We claim:

1. A data storage and retrieval system, comprising:

one or more hard disks individually disposed in one or more portable hard disk drive units;

a rail extending from one end of said data storage and retrieval system to the opposite end of said data storage and retrieval system;

one or more moveable accessors, wherein each of those one or more moveable accessors comprises a carriage section capable of moving bidirectionally along said rail along a first axis, an X/Y movement control card comprising a memory device disposed on said carriage assembly, a lifting servo section capable of moving bidirectionally along a second axis, wherein said first axis is perpendicular to said second axis, a gripper mechanism disposed on said lifting servo section, and an accessor control card disposed on said lifting servo section;

one or more first servers, wherein each of said one or more first servers comprises a first operating system and a storage management program;

a first information transfer station comprising a plurality of information transfer slots, wherein one or more of said one or more portable hard disk drive units can be releaseably coupled to said first information transfer station;

a first communication link interconnecting said one or more first servers and said first information transfer station;

one or more second servers, wherein each of said one or more second servers comprises a second operating system, and wherein said one or more second servers do not comprise a storage management program;

a second information transfer station comprising a plurality of information transfer slots, wherein one or more of said one or more portable hard disk drive units can be releaseably coupled to said second information transfer station; and a second communication link interconnecting said one or more second servers and said second information transfer station.

2. The data storage and retrieval system of claim 1, wherein each of said plurality of information transfer slots comprises a backplane, an information connector disposed on said backplane, and a power connector disposed on said backplane.

3. The data storage and retrieval system of claim 1, further comprising a first memory device interconnected with said first communication link.

4. The data storage and retrieval system of claim 3, further comprising a second memory device interconnected with said second communication link.

5. The data storage and retrieval system of claim 1, wherein said one or more first servers each comprise one or more information input devices and one or more information display devices.

6. A method to perform a disk operation using a data storage and retrieval system, comprising the steps of:

providing a data storage and retrieval system comprising:

one or more hard disks individually disposed in one or more portable hard disk drive units;

a rail extending from one end of said data storage and retrieval system to the opposite end of said data storage and retrieval system;

one or more moveable accessors, wherein each of those one or more moveable accessors comprises a carriage section capable of moving bidirectionally along said rail along a first axis, an X/Y movement control card comprising a memory device disposed on said carriage assembly, a lifting servo section capable of moving bidirectionally along a second axis, wherein said first axis is perpendicular to said second axis, a gripper mechanism disposed on said lifting servo section, and an accessor control card disposed on said lifting servo section;

one or more first servers, wherein each of said one or more first servers comprises a first operating system and a storage management program;

a first information transfer station comprising a plurality of information transfer slots, wherein one or more of said one or more portable hard disk drive units can be releaseably coupled to said first information transfer station;

a first communication link interconnecting said one or more first servers and said first information transfer station;

one or more second servers, wherein each of said one or more second servers comprises a second operating system, and wherein said one or more second servers do not comprise a storage management program;

a second information transfer station comprising a plurality of information transfer slots, wherein one or more of said one or more portable hard disk drive units can be releaseably coupled to said second information transfer station; and a second communication link interconnecting said one or more second servers and said second information transfer station;

receiving a request from said one or more first servers to perform a disk operation on a designated one of said one or more hard disks, wherein said one or more first servers comprise a storage management program;

releaseably coupling said designated hard disk to said second information transfer station; and performing said disk operation using said one or more second servers, wherein said one or more second servers do not comprise a storage management program.

7. The method of claim 6, wherein said disk operation comprises formatting said designated hard disk.

8. The method of claim 6, wherein said disk operation comprises defragmenting said designated hard disk.

9. A method to store information using a data storage and retrieval system, comprising the steps of:

providing a data storage and retrieval system comprising:

one or more hard disks individually disposed in one or more portable hard disk drive units;

a rail extending from one end of said data storage and retrieval system to the opposite end of said data storage and retrieval system;

one or more moveable accessors, wherein each of those one or more moveable accessors comprises a carriage section capable of moving bidirectionally along said rail along a first axis, an X/Y movement control card comprising a memory device disposed on said carriage assembly, a lifting servo section capable of moving bidirectionally along a second axis, wherein said first axis is perpendicular to said second axis, a gripper mechanism disposed on said lifting servo section, and an accessor control card disposed on said lifting servo section;

one or more first servers, wherein each of said one or more first servers comprises a first operating system and a storage management program;

a first information transfer station comprising a plurality of information transfer slots, wherein one or more of said one or more portable hard disk drive units can be releaseably coupled to said first information transfer station;

a first communication link interconnecting said one or more first servers and said first information transfer station;

one or more second servers, wherein each of said one or more second servers comprises a second operating system, and wherein said one or more second servers do not comprise a storage management program;

a second information transfer station comprising a plurality of information transfer slots, wherein one or more of said one or more portable hard disk drive units can be releaseably coupled to said second information transfer station; and a second communication link interconnecting said one or more second servers and said second information transfer station;

receiving information from said one or more first servers, wherein said one or more first servers each comprises a storage management program;

designating one or more of said one or more hard disks;

releaseably coupling said transfer hard disk to said first information transfer station;

writing said information on said transfer hard disk;

releaseably coupling said transfer hard disk to said second information transfer station;

copying said information on said one or more second servers, wherein said one or more second servers do not comprise a storage management program;

releaseably coupling to said second information transfer station said one or more designated hard disks; and writing said information on said one or more designated hard disks.

10. The method of claim 9, further comprising the steps of:

erasing said information from said transfer hard disk; and storing said transfer hard disk.

11. A method to retrieve information from a data storage and retrieval system, comprising the steps of:

providing a data storage and retrieval system comprising:

one or more hard disks individually disposed in one or more portable hard disk drive units;

a rail extending from one end of said data storage and retrieval system to the opposite end of said data storage and retrieval system;

one or more moveable accessors, wherein each of those one or more moveable accessors comprises a carriage section capable of moving bidirectionally along said rail along a first axis, an X/Y movement control card comprising a memory device disposed on said carriage assembly, a lifting servo section capable of moving bidirectionally along a second axis, wherein said first axis is perpendicular to said second axis, a gripper mechanism disposed on said lifting servo section, and an accessor control card disposed on said lifting servo section;

one or more first servers, wherein each of said one or more first servers comprises a first operating system and a storage management program;

a first information transfer station comprising a plurality of information transfer slots, wherein one or more of said one or more portable hard disk drive units can be releaseably coupled to said first information transfer station;

a first communication link interconnecting said one or more first servers and said first information transfer station;

one or more second servers, wherein each of said one or more second servers comprises a second operating system, and wherein said one or more second servers do not comprise a storage management program;

a second information transfer station comprising a plurality of information transfer slots, wherein one or more of said one or more portable hard disk drive units can be releaseably coupled to said second information transfer station; and a second communication link interconnecting said one or more second servers and said second information transfer station;

receiving from said one or more first servers a request to retrieve information stored on one or more of said one or more hard disks, wherein said one or more first servers each comprises a storage management program;

selecting one of said one or more hard disks;

releaseably coupling said selected hard disk to said second information transfer station;

determining using said one or more second servers if said information is stored on said selected hard disk, wherein said one or more second servers do not comprise a storage management program;

operative if said information is stored on said selected hard disk, releaseably coupling said selected hard disk to said first information transfer station; and providing said information to said one or more first servers.

12. The method of claim 11, wherein said one or more first servers select said one of said one or more hard disks.

13. The method of claim 11, wherein said data storage and retrieval system selects said one of said one or more hard disks.

14. The method of claim 11, further comprising the steps of:

copying said information from said selected hard disk to said one or more second servers;

designating one or more of said one or more hard disks;

releaseably coupling said one or more designated hard disks to said second information transfer station; and copying said information on said one or more designated hard disks.

15. The method of claim 14, wherein said one or more first servers designates said one or more of said one or more hard disks.

16. The method of claim 14, wherein said data storage and retrieval system designates said one or more of said one or more hard disks.

17. A method to transfer information between servers using a data storage and retrieval system, comprising the steps of:
providing a data storage and retrieval system comprising:
one or more hard disks individually disposed in one or more portable hard disk drive units;
a rail extending from one end of said data storage and retrieval system to the opposite end of said data storage and retrieval system;
one or more moveable accessors, wherein each of those one or more moveable accessors comprises a memory device, a carriage section capable of moving bidirectionally along said rail along a first axis, an X/Y movement control card comprising a memory device disposed on said carriage assembly, a lifting servo section capable of moving bidirectionally along a second axis, wherein said first axis is perpendicular to said second axis, a gripper mechanism disposed on said lifting servo section, and an accessor control card disposed on said lifting servo section;
one or more first servers, wherein each of said one or more first servers comprises a first operating system and a storage management program;
a first information transfer station comprising a plurality of information transfer slots, wherein one or more of said one or more portable hard disk drive units can be releaseably coupled to said first information transfer station;
a first communication link interconnecting said one or more first servers and said first information transfer station;
one or more second servers, wherein each of said one or more second servers comprises a second operating system, and wherein said one or more second servers do not comprise a storage management program;
a second information transfer station comprising a plurality of information transfer slots, wherein one or more of said one or more portable hard disk drive units can be releaseably coupled to said second information transfer station; and
a second communication link interconnecting said one or more second servers and said second information transfer station;
receiving a request from said one or more first servers to transfer information to said one or more second servers, wherein said one or more first servers each comprises a storage management program, and wherein said one or more second servers do not comprise a storage management program;
releaseably coupling said information connector to said first information transfer station;
storing said information in said memory device;
releaseably coupling said information connector to said second information transfer station; and
copying said information from said memory device to said one or more second servers.

18. A data storage and retrieval system comprising a computer useable medium having computer readable program code disposed therein for performing a disk operation, wherein said data storage and retrieval system comprises:
one or more hard disks individually disposed in one or more portable hard disk drive units;
a rail extending from one end of said data storage and retrieval system to the opposite end of said data storage and retrieval system;
one or more moveable accessors, wherein each of those one or more moveable accessors comprises a carriage section capable of moving bidirectionally along said rail along a first axis, an X/Y movement control card comprising a memory device disposed on said carriage assembly, a lifting servo section capable of moving bidirectionally along a second axis, wherein said first axis is perpendicular to said second axis, a gripper mechanism disposed on said lifting servo section, and an accessor control card disposed on said lifting servo section;
one or more first servers, wherein each of said one or more first servers comprises a first operating system and a storage management program;
a first information transfer station comprising a plurality of information transfer slots, wherein one or more of said one or more portable hard disk drive units can be releaseably coupled to said first information transfer station;
a first communication link interconnecting said one or more first servers and said first information transfer station;
one or more second servers, wherein each of said one or more second servers comprises a second operating system, and wherein said one or more second servers do not comprise a storage management program;
a second information transfer station comprising a plurality of information transfer slots, wherein one or more of said one or more portable hard disk drive units can be releaseably coupled to said second information transfer station; and
a second communication link interconnecting said one or more second servers and said second information transfer station;
the computer readable program code comprising a series of computer readable program steps to effect:
receiving a request from said one or more first servers to perform a disk operation on a designated one of said one or more hard disks, wherein said one or more first servers each comprises a storage management program;
releaseably coupling said designated hard disk to said second information transfer station; and
performing said disk operation using said one or more second servers, wherein said one or more second servers do not comprise a storage management program.

19. The data storage and retrieval system of claim 18, wherein said disk operation comprises formatting said designated hard disk.

20. The data storage and retrieval system of claim 18, wherein said disk operation comprises defragmenting said designated hard disk.

21. A data storage and retrieval system comprising a computer useable medium having computer readable program code disposed therein for storing information on two or more hard disks, wherein said data storage and retrieval system comprises:
one or more hard disks individually disposed in one or more portable hard disk drive units;

a rail extending from one end of said data storage and retrieval system to the opposite end of said data storage and retrieval system;

one or more moveable accessors, wherein each of those one or more moveable accessors comprises a carriage section capable of moving bidirectionally along said rail along a first axis, an X/Y movement control card comprising a memory device disposed on said carriage assembly, a lifting servo section capable of moving bidirectionally along a second axis, wherein said first axis is perpendicular to said second axis, a gripper mechanism disposed on said lifting servo section, and an accessor control card disposed on said lifting servo section;

one or more first servers, wherein each of said one or more first servers comprises a first operating system and a storage management program;

a first information transfer station comprising a plurality of information transfer slots, wherein one or more of said one or more portable hard disk drive units can be releaseably coupled to said first information transfer station;

a first communication link interconnecting said one or more first servers and said first information transfer station;

one or more second servers, wherein each of said one or more second servers comprises a second operating system, and wherein said one or more second servers do not comprise a storage management program;

a second information transfer station comprising a plurality of information transfer slots, wherein one or more of said one or more portable hard disk drive units can be releaseably coupled to said second information transfer station; and a second communication link interconnecting said one or more second servers and said second information transfer station;

the computer readable program code comprising a series of computer readable program steps to effect:

receiving information from said one or more first servers, wherein said one or more first servers each comprises a storage management program;

designating one or more of said one or more hard disks;

releaseably coupling said transfer hard disk to said first information transfer station;

writing said information on said transfer hard disk;

releaseably coupling said transfer hard disk to said second information transfer station;

copying said information on said one or more second servers, wherein said one or more second servers do not comprise a storage management program;

releaseably coupling to said second information transfer station said one or more designated hard disks; and writing said information on said one or more designated hard disks.

22. The data storage and retrieval system of claim 21, wherein the computer readable program code further comprises a series of computer readable program steps to effect:

erasing said information from said transfer hard disk; and storing said transfer hard disk.

23. A data storage and retrieval system comprising a computer useable medium having computer readable program code disposed therein for retrieving information stored on one or more hard disks, wherein said data storage and retrieval system comprises:

providing a data storage and retrieval system comprising:

one or more hard disks individually disposed in one or more portable hard disk drive units;

a rail extending from one end of said data storage and retrieval system to the opposite end of said data storage and retrieval system;

one or more moveable accessors, wherein each of those one or more moveable accessors comprises a carriage section capable of moving bidirectionally along said rail along a first axis, an X/Y movement control card comprising a memory device disposed on said carriage assembly, a lifting servo section capable of moving bidirectionally along a second axis, wherein said first axis is perpendicular to said second axis, a gripper mechanism disposed on said lifting servo section, and an accessor control card disposed on said lifting servo section;

one or more first servers, wherein each of said one or more first servers comprises a first operating system and a storage management program;

a first information transfer station comprising a plurality of information transfer slots, wherein one or more of said one or more portable hard disk drive units can be releaseably coupled to said first information transfer station;

a first communication link interconnecting said one or more first servers and said first information transfer station;

one or more second servers, wherein each of said one or more second servers comprises a second operating system, and wherein said one or more second servers do not comprise a storage management program;

a second information transfer station comprising a plurality of information transfer slots, wherein one or more of said one or more portable hard disk drive units can be releaseably coupled to said second information transfer station; and a second communication link interconnecting said one or more second servers and said second information transfer station;

the computer readable program code comprising a series of computer readable program steps to effect:

receiving from said one or more first servers a request to retrieve designated information, wherein said one or more first servers each comprises a storage management program;

selecting one of said one or more hard disks;

releaseably coupling said selected hard disk to said second information transfer station;

determining using said one or more second servers if said designated information is stored on said selected hard disk, wherein said one or more second servers do not comprise a storage management program;

operative if said designated information is stored on said selected hard disk, releaseably coupling said selected hard disk to said first information transfer station; and providing said designated information to said one or more first servers.

24. The data storage and retrieval system of claim 23, wherein the computer readable program code further comprises a series of computer readable program steps to effect:

copying said designated information from said selected hard disk to said one or more second servers;

designating one or more of said one or more hard disks;

releaseably coupling said one or more designated hard disks to said second information transfer station; and copying said designated information on said one or more designated hard disks.

25. A data storage and retrieval system comprising a computer useable medium having computer readable program code disposed therein for transferring information between servers, wherein said data storage and retrieval system comprises:

providing a data storage and retrieval system comprising:

one or more hard disks individually disposed in one or more portable hard disk drive units;

a rail extending from one end of said data storage and retrieval system to the opposite end of said data storage and retrieval system;

one or more moveable accessors, wherein each of those one or more moveable accessors comprises a carriage section capable of moving bidirectionally along said rail along a first axis, an X/Y movement control card comprising a memory device disposed on said carriage assembly, a lifting servo section capable of moving bidirectionally along a second axis, wherein said first axis is perpendicular to said second axis, a gripper mechanism disposed on said lifting servo section, and an accessor control card disposed on said lifting servo section;

one or more first servers, wherein each of said one or more first servers comprises a first operating system and a storage management program;

a first information transfer station comprising a plurality of information transfer slots, wherein one or more of said one or more portable hard disk drive units can be releaseably coupled to said first information transfer station;

a first communication link interconnecting said one or more first servers and said first information transfer station;

one or more second servers, wherein each of said one or more second servers comprises a second operating system, and wherein said one or more second servers do not comprise a storage management program;

a second information transfer station comprising a plurality of information transfer slots, wherein one or more of said one or more portable hard disk drive units can be releaseably coupled to said second information transfer station; and a second communication link interconnecting said one or more second servers and said second information transfer station;

the computer readable program code comprising a series of computer readable program steps to effect:

receiving a request from said one or more first servers to transfer information to said one or more second servers, wherein said one or more first servers each comprises a storage management program, and wherein said one or more second servers do not comprise a storage management program;

releaseably coupling said information connector to said first information transfer station;

storing said information in said memory device;

releaseably coupling said information connector to said second information transfer station; and copying said information from said memory device to said one or more second servers.

26. A method to transfer information from a first data storage library to a second data storage library, comprising the steps of:

providing one or more first servers;

providing a second data storage library comprising one or more portable storage media, wherein said second data storage library is capable of communication with said one or more first servers;

providing a first data storage library capable of communication with said one or more first servers, comprising:

one or more first portable storage media;

a rail extending from one end of said data storage and retrieval system to the opposite end of said data storage and retrieval system;

one or more moveable accessors, wherein each of those one or more moveable accessors comprises a carriage section capable of moving bidirectionally along said rail along a first axis, an X/Y movement control card comprising a memory device disposed on said carriage assembly, a lifting servo section capable of moving bidirectionally along a second axis, wherein said first axis is perpendicular to said second axis, a gripper mechanism disposed on said lifting servo section, and an accessor control card disposed on said lifting servo section;

a first information transfer station comprising a plurality of information transfer slots, wherein one or more of said one or more portable hard disk drive units can be releaseably coupled to said first information transfer station;

a first communication link interconnecting said one or more first servers and said first information transfer station;

a second information transfer station comprising a plurality of information transfer slots, wherein one or more of said one or more portable hard disk drive units can be releaseably coupled to said second information transfer station; and a second communication link interconnecting said one or more second servers and said second information transfer station;

receiving a request from said one or more first servers to transfer information stored on one or more designated first portable data storage media to one or more designated second portable data storage media, wherein said one or more first servers each comprises a storage management program;

releaseably coupling said one or more designated first portable data storage media to said first information transfer station;

copying said information by said one or more second servers, wherein said one or more second servers do not comprise a storage management program;

releaseably coupling said one or more designated second portable data storage media to said second information transfer station; and writing said information on said one or more designated second portable data storage media.

27. The method of claim 26, wherein said first portable data storage media are selected from the group consisting of magnetic storage media, optical storage media, and electronic storage media.

28. The method of claim 26, wherein said second portable data storage media are selected from the group consisting of magnetic storage media, optical storage media, and electronic storage media.

29. A data storage and retrieval system comprising a computer useable medium having computer readable program code disposed therein for transferring information between a first data storage library and a second data storage library, wherein said first data storage library comprises:

one or more first portable storage media;

a rail extending from one end of said data storage and retrieval system to the opposite end of said data storage and retrieval system;

one or more moveable accessors, wherein each of those one or more moveable accessors comprises a carriage section capable of moving bidirectionally along said rail along a first axis, an X/Y movement control card comprising a memory device disposed on said carriage assembly, a lifting servo section capable of moving bidirectionally along a second axis, wherein said first axis is perpendicular to said second axis, a gripper mechanism disposed on said lifting servo section, and an accessor control card disposed on said lifting servo section;

a first information transfer station comprising a plurality of information transfer slots, wherein one or more of said one or more portable hard disk drive units can be releaseably coupled to said first information transfer station;

a first communication link interconnecting said one or more first servers and said first information transfer station;

a second information transfer station comprising a plurality of information transfer slots, wherein one or more of said one or more portable hard disk drive units can be releaseably coupled to said second information transfer station; and a second communication link interconnecting said one or more second servers and said second information transfer station;

wherein said second data storage library comprises:

one or more portable storage media, wherein said second data storage library is capable of communication with said one or more first servers the computer readable program code comprising a series of computer readable program steps to effect:

receiving a request from said one or more first servers to transfer information stored on one or more designated first portable data storage media to one or more designated second portable data storage media, wherein said one or more first servers each comprises a storage management program;

releaseably coupling said one or more designated first portable data storage media to said first information transfer station;

copying said information by said one or more second servers, wherein said one or more second servers do not comprise a storage management program;

releaseably coupling said one or more designated second portable data storage media to said second information transfer station; and writing said information on said one or more designated second portable data storage media.

30. The data storage and retrieval system of claim 29, wherein said first portable data storage media are selected from the group consisting of magnetic storage media, optical storage media, and electronic storage media.

31. The data storage and retrieval system of claim 29, wherein said second portable data storage media are selected from the group consisting of magnetic storage media, optical storage media, and electronic storage media.

* * * * *